(12) United States Patent
Haines et al.

(10) Patent No.: US 9,183,134 B2
(45) Date of Patent: Nov. 10, 2015

(54) DATA SEGREGATION IN A STORAGE DEVICE

(75) Inventors: Jonathan W. Haines, Boulder, CO (US); Timothy R. Feldman, Louisville, CO (US); Wayne H. Vinson, Longmont, CO (US); Ryan J. Goss, Lakeville, MN (US); Kevin Gomez, Eden Prairie, MN (US); Mark Allen Gaertner, Vadnais Heights, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 836 days.

(21) Appl. No.: 12/765,761

(22) Filed: Apr. 22, 2010

(65) Prior Publication Data

US 2011/0264843 A1 Oct. 27, 2011

(51) Int. Cl.
*G06F 12/02* (2006.01)

(52) U.S. Cl.
CPC .... *G06F 12/0246* (2013.01); *G06F 2212/1036* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 5,737,742 A | 4/1998 | Achiwa et al. | |
| 7,467,278 B2 | 12/2008 | Creamer et al. | |
| 7,849,275 B2 | 12/2010 | Danilak | |
| 7,908,423 B2* | 3/2011 | Hsu et al. | 711/100 |
| 7,949,637 B1 | 5/2011 | Burke | |
| 8,065,469 B2 | 11/2011 | Mothilal | |
| 8,078,794 B2 | 12/2011 | Lee et al. | |
| 8,275,933 B2 | 9/2012 | Flynn et al. | |
| 8,339,881 B2 | 12/2012 | Danilak | |
| 8,447,918 B2 | 5/2013 | Sprinkle et al. | |
| 8,463,984 B2 | 6/2013 | Olds et al. | |
| 2003/0065899 A1* | 4/2003 | Gorobets | 711/165 |
| 2006/0062048 A1* | 3/2006 | Gonzalez et al. | 365/185.11 |
| 2007/0101095 A1 | 5/2007 | Gorobets | |
| 2007/0156998 A1 | 7/2007 | Gorobets | |
| 2007/0198769 A1 | 8/2007 | Shin et al. | |
| 2007/0208904 A1* | 9/2007 | Hsieh et al. | 711/103 |
| 2007/0245068 A1* | 10/2007 | Yero | 711/103 |
| 2009/0049234 A1 | 2/2009 | Oh et al. | |
| 2009/0113112 A1 | 4/2009 | Ye et al. | |
| 2009/0125671 A1 | 5/2009 | Flynn et al. | |
| 2009/0157952 A1 | 6/2009 | Kim et al. | |
| 2009/0172263 A1* | 7/2009 | Olbrich et al. | 711/103 |
| 2009/0182791 A1 | 7/2009 | Gorobets | |
| 2010/0037009 A1* | 2/2010 | Yano et al. | 711/103 |
| 2011/0066808 A1 | 3/2011 | Flynn et al. | |
| 2011/0099320 A1* | 4/2011 | Lucas et al. | 711/103 |
| 2011/0145473 A1* | 6/2011 | Maheshwari | 711/103 |

(Continued)

OTHER PUBLICATIONS

Siwoo Byun and Moonhaeng Hur, "An Index Management using CHC-cluster for Flash Memory Databases", Online publication Dec. 2008, The Journal of Systems and Sofware 82, ScienceDirect, pp. 825-835.*

(Continued)

*Primary Examiner* — Yaima Rigol
(74) *Attorney, Agent, or Firm* — Hollingsworth Davis, LLC

(57) ABSTRACT

An example method includes providing at least two data storage areas in a memory, providing a first amount of over-provisioning for a first of the at least two data storage areas and a second amount of over-provisioning for a second of the at least two data storage areas, categorizing data based on a characteristic of the data, and storing the data in one of the at least two data storage areas based on the categorization.

40 Claims, 15 Drawing Sheets

(56) References Cited

U.S. PATENT DOCUMENTS

| | | | |
|---|---|---|---|
| 2011/0153911 A1* | 6/2011 | Sprouse et al. | 711/103 |
| 2011/0191521 A1* | 8/2011 | Araki et al. | 711/103 |
| 2011/0246701 A1 | 10/2011 | Kano et al. | |
| 2011/0314220 A1 | 12/2011 | Matsumura et al. | |
| 2012/0023144 A1 | 1/2012 | Rub | |

OTHER PUBLICATIONS

Evaluating Subject Matter Eligibility Under 35 USC 101, Aug. 2012 Update, pp. 1-73, http://www.uspto.gov/patents/law/exam/101_training_aug2012.pdf.*

Hsieh et al., "Efficient Identification of Hot Data for Flash-Memory Storage Systems," Department of Computer Science and Information Engineering, National Taiwan University, Taipai, Taiwan 106, R.O.C, Feb. 2006,19 pp.

Chang at al., "Efficient Management for Large-Scale Flash-Memory Storage Systems with Resource Conservation," Term paper from National Chiao-Tung University, Hsin-Chu, Taiwan, published on May 13, 2009, 37 pp.

Rayankula et al., "A block-clustering based approach to implement wear leveling in SSD," Project Report for University of Minnesota CSci 8980; Advanced Storage Systems, published on May 13, 2009, 22 pp.

Jung et al., "Cache over Solid State Disk through DiskSIM," Term Project Final Report from University of Minnesota CSci 8980; Advanced Storage Systems, published on May 13, 2009, 29 pp.

Narang et al., "Integrated Caching end Wear Leveling Algorithm," Term paper, Department of Computer Science, University of Minnesota, published on May 13, 2009, 7 pp.

Mohammed et al., "Improving Hot Data Identification for Hybrid SLC/MLC Device," Term paper from University of Minnesota CSCI 8980; Advanced Storage Systems, published on May 13, 2009, 9 pp.

U.S. Appl. No. 12/721,490, entitled "Logical Block Storage in a Storage Device," filed Mar. 10, 2010.

U.S. Appl. No. 12/721,466, entitled "Garbage Collection in a Storage Device," filed Mar. 10, 2010.

File History for U.S. Appl. No. 12/721,466.

File History for U.S. Appl. No. 12/721,490.

Chiang et al., "Managing Flash Memory in Personal Communication Devices", Consumer Electronics, 1997. ISCE '97., Proceedings of 1997 IEEE International Symposium on Singapore Dec. 2-4, 1997, New York, NY, USA, IEEE, US, Dec. 2, 1997, pp. 177-182.

International Preliminary Report on Patentability dated Oct. 23, 2012 from PCT Application No. PCT/US2011/033208, 6 pages.

* cited by examiner

DATA SEGREGATION IN A STORAGE DEVICE

BACKGROUND

Computers and other electronic devices generally require a medium in which digital data can be stored and retrieved. Data storage devices come in a variety of forms and serve a variety of purposes. These devices can be typically broken down into two general categories: solid state and non-solid state storage devices.

Non-solid state devices are devices that contain moving parts. Some typical non-solid state storage devices are hard disk drives, compact disc read/write drives and disks, digital video disc read and read/write drives and disks, floppy disks, tape drives and probe memory devices. These storage devices move one or more media surfaces and/or the associated data head relative to one another to position the data head relative to a desired location or area on the media. The data is then written to or read from this data location. In disk drives, for example, data is stored on a disk that rotates at an essentially constant velocity. By moving the head over the rotating disk, all memory locations or sectors of the disk can be accessed.

Solid state storage devices differ from non-solid state devices in that they typically have no moving parts. Solid state storage devices may be used for primary storage of data for a computing device, such as a personal computer, workstation computer, or server computer. An example of a solid state storage device is flash memory.

Flash memory, e.g., NAND flash memory, is comprised of a number of cells, with each cell being similar to a metal-oxide semiconductor (MOS) field-effect transistor (FET) and having a gate, a drain, and a source. In addition, the cell includes a "floating gate." When a voltage is applied between the gate and the source, the voltage difference between the gate and the source creates an electric field, thereby allowing electrons to flow between the drain and the source in the conductive channel created by the electric field. When strong enough, the electric field may force electrons flowing in the channel onto the floating gate via Fowler-Nordheim quantum tunneling. The number of electrons on the floating gate determines a threshold voltage level of the cell.

Flash memory may typically be broken into two categories: single-level cell (SLC) and multi-level cell (MLC). In SLC flash memory, two voltage levels are used for each cell, thus allowing SLC flash memory to store one bit of information per cell. In MLC flash memory, more than two voltage levels are used for each cell, thus allowing MLC flash memory to store more than one bit per cell.

Flash memory may suffer from more wear than non-solid state devices. That is, charges may be applied and removed, e.g., the cell may be written and erased, a finite number of times before the structure of the cell may become physically compromised. Although MLC flash memory is capable of storing more bits than SLC flash memory, MLC flash memory typically suffers from more wear than SLC flash memory.

SUMMARY

In one example, the disclosure is directed to a method that comprises providing at least two data storage areas in a non-volatile memory, providing a first amount of over-provisioning for a first of the at least two data storage areas and a second amount of over-provisioning for a second of the at least two data storage areas, categorizing data based on a characteristic of the data, and storing the data in either the first or the second of the at least two data storage areas based on the categorization.

In another example, the disclosure is directed to a system that comprises a non-volatile memory and at least one controller configured to provide at least two data storage areas in the non-volatile memory, provide a first amount of over-provisioning for a first of the at least two data storage areas and a second amount of over-provisioning for a second of the at least two data storage areas, categorize data based on a characteristic of the data, and store the data in either the first or the second of the at least two data storage areas based on the categorization.

In another example, the disclosure is directed to a computer-readable medium comprising instructions encoded on the computer-readable medium that, upon execution, cause a controller within a device to provide at least two data storage areas in a non-volatile memory, provide a first amount of over-provisioning for a first of the at least two data storage areas and a second amount of over-provisioning for a second of the at least two data storage areas, categorize data based on a characteristic of the data, and store the data in either the first or the second of the at least two data storage areas based on the categorization.

These and various other features and advantages will be apparent from a reading of the following detailed description.

DETAILED DESCRIPTION

In general, this disclosure describes techniques for partitioning a solid state drive into two or more data storage areas, providing over-provisioning for each of the data storage areas, and storing data in the data storage areas based on characteristics of the data. As will be described in more detail below, over-provisioning generally refers to the difference between the amount of data made available to the host (or a user thereof) and the actual amount of data that can be stored on solid state drive. That is, a solid state drive may be capable of storing a greater amount of data than advertised to a user and/or user's host. In certain examples, such over-provisioning and segregation of data may be used for reducing wear in a solid state drive (SSD).

Figure 1:
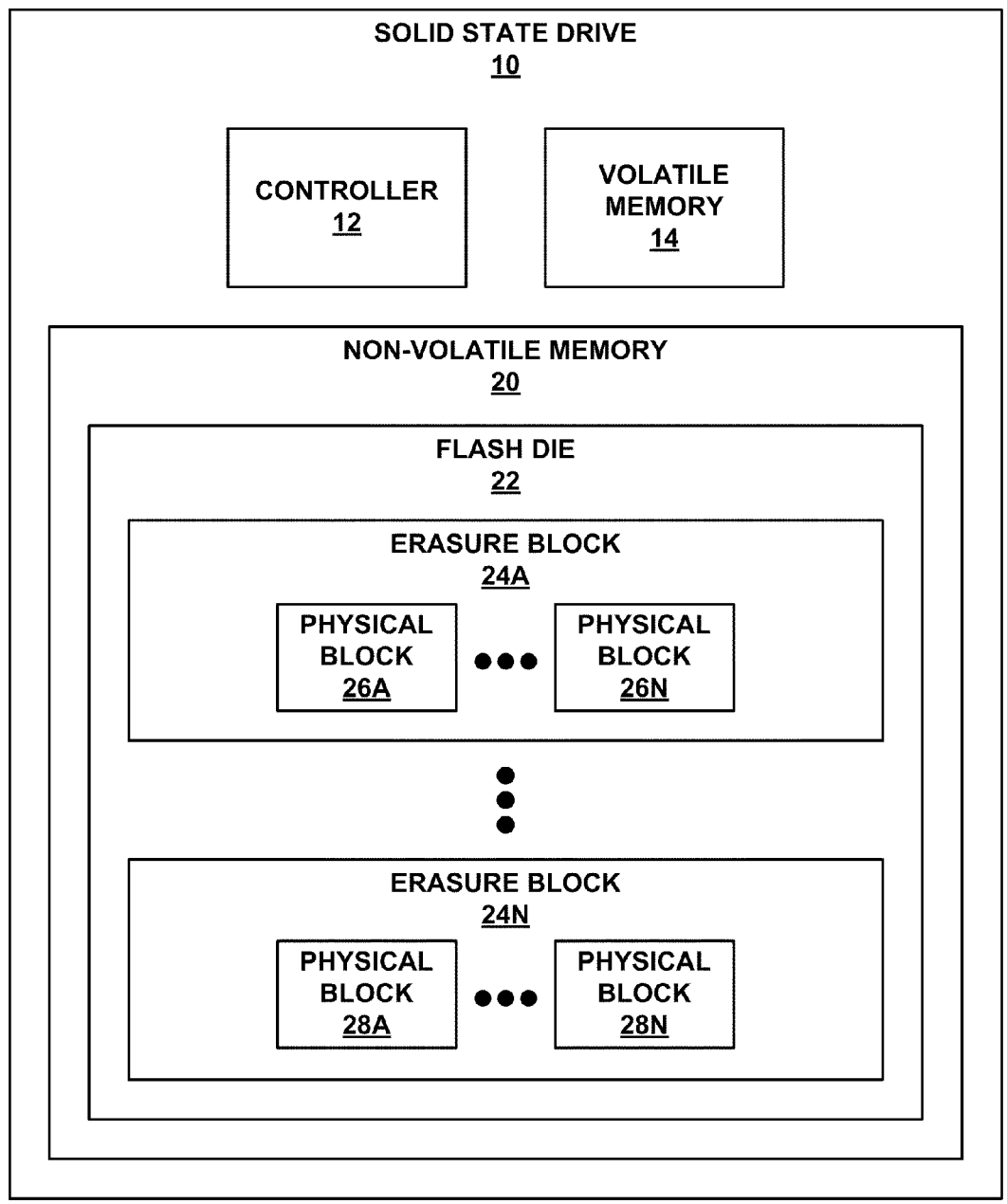
FIG. 1 is a block diagram illustrating an example solid state drive (SSD).

FIG. 1 is a block diagram illustrating an example solid state drive (SSD) 10. In the example of FIG. 1, SSD 10 includes controller 12, volatile memory 14, and non-volatile memory 20. Volatile memory 14 may correspond to random access memory (RAM). Non-volatile memory 20 corresponds to long-term storage of SSD 10. In general, SSD 10 includes one or more flash dies, such as flash die 22, each of which include a plurality of erasure blocks 24A-24N ("erasure blocks 24"). Flash die 22 may generally be one of a number of dies included within a semiconductor chip, and an SSD 10 may comprise one or more semiconductor chips. Each of erasure blocks 24 includes a plurality of physical blocks.

In the example of FIG. 1, erasure block 24A includes physical blocks 26A-26N ("physical blocks 26") and erasure block 24N includes physical blocks 28A-28N ("physical blocks 28"). Physical blocks may also be referred to throughout this disclosure as "pages." It should be understood that the letter N in the reference numerals above is a non-negative integer and that the use of N with respect to different reference numbers should not be understood as implying that the number of items are equal. For example, the number of physical blocks 26 is not necessarily equal to the number of physical blocks 28. Likewise, the number of erasure blocks 24 is not necessarily equal to the number of physical blocks 26 or the number of physical blocks 28.

In the example of FIG. 1, SSD 10 includes controller 12. Controller 12 comprises hardware, such as one or more processors, microprocessors, digital signal processor (DSPs), application specific integrated circuits (ASICs), field programmable gate arrays (FPGAs), or any other equivalent integrated or discrete logic circuitry for performing the functions ascribed to controller 12. In other examples, a computing device (not shown) coupled to SSD 10 may implement the functionality ascribed to controller 12. For example, an SSD may not include controller 12, and instead a software driver implemented by an operating system of the computing device may perform the functions of controller 12. In this manner, a processor or other control unit separate from SSD 10 may control SSD 10. In some examples, controller 12 may include a memory (not shown). A memory in controller 12 may be used to store metadata. For example, controller 12 may include memory that stores metadata that represents a frequency of write access of data written to SSD 10 (e.g., temperature of the data).

In general, SSD 10 stores data for a long-term period in a physical block, such as physical block 26A of erasure block 24A. Host data is referenced by logical block addresses (LBA) of host blocks. Controller 12 also writes data regarding each physical block to a header in the physical block. The header generally includes metadata that describes data of the corresponding physical block. The header may include data such as a number of LBAs stored in the corresponding physical block and a size or length of the header.

Before writing data to a physical block, such as physical block 26A, controller 12 writes the data to volatile memory 14. Controller 12 accumulates a full physical block of data in volatile memory 14 before writing the physical block to non-volatile memory 20, e.g., in physical block 26A. As controller 12 receives LBAs to be stored from a host (e.g., a computing device coupled to SSD 10), controller 12 writes the received LBAs to volatile memory 14. In some examples, controller 12 also compresses the data in volatile memory 14.

Compressing data results in effective over-provisioning. In general, over-provisioning refers to the difference between the amount of data made available to the host (or a user thereof) and the actual amount of data that can be stored on SSD 10. That is, SSD 10 may, in some examples, be capable of storing a greater amount of data than advertised to a user and/or user's host. For instance, SSD 10 may advertise the capability to store X bytes of data to the host, but in actuality may be capable of storing Y bytes of data where Y>X. When SSD 10 can store more than X bytes of data, SSD 10 is said to be over-provisioned. The value X represents an advertised amount of total storage in SSD 10. SSD 10 may use compression techniques, additional physical memory, or a combination thereof to provide over-provisioning. For example, if (X=Y) and controller 12 can compress data by a ratio of 2:1, then ½ X is not necessary to store data.

There are several advantages that stem from using over-provisioning in an SSD. For example, SSD 10 may operate faster if there is over-provisioning because when controller 12 is searching for an available physical block, e.g., page, to write new data, there may be more physical blocks available to be written to at the time controller 12 is searching. With sufficient over-provisioning, controller 12 may avoid the need to copy data internally in order to get an erasure block fully available for writing. Thus, with sufficient over-provisioning, controller 12 may quickly locate an available physical block for writing data, when needed, because there are fewer garbage collecting operations needed.

It should be noted that an erasure block is completely erased in order for any physical block in the erasure block to be written to. The selection of erasure blocks from which to collect valid data and the internal copying of data from those erasure blocks to free up entire erasure blocks for writing is referred to as "garbage collection." If garbage collection is using fewer resources, then more back-end flash resource space may be available for host data to be written to, thereby potentially increasing performance.

Another advantage of over-provisioning is reduction in wear to the non-volatile memory, e.g., SLC flash. Copying data internally via garbage collection techniques causes additional wear to the flash. The wear caused by garbage collection is not the result of the host providing data that needs to be written, but rather the internal data-copying techniques necessary for effective data storage in non-volatile memory 20.

For example, assume that data may be randomly written to erasure blocks in the non-volatile memory, that a mapping strategy allows any LBA to be put in any portion of the non-volatile memory, and that metadata (e.g., a table) keeps track of the location of the LBAs in physical space. As data in erasure blocks 24 are re-written into different ones of erasure blocks 24, holes containing invalid data are "created" in the erasure blocks. That is, erasure blocks 24 contain valid data as well as data of LBAs that are no longer valid. Until the entire erasure block is erased, no data may be written to the erasure block. Garbage collection techniques copy all the valid data from a first erasure block to a second erasure block, e.g., a partially filled erasure block, thereby freeing up the first erasure block to be erased. With sufficient over-provisioning, the frequency for performing garbage collection may be reduced because, with random writes, it is more likely controller 12 will find an erasure block that is available for receiving new data, i.e., an erasure block with little or no data that needs to be copied out of the block before erasure to make the block available once again for writing. As such, over-provisioning provides a wear-benefit.

In an SSD, data is often grouped together for mapping efficiency reasons and/or flash architecture reasons. If the host changes any of the data in the SSD, such grouping may require that the entire group of data be moved and mapped to another region of the storage media. In the case of an SSD utilizing NAND flash, this grouping affects all data within an erasure block, whether the fundamental mapping unit is an erasure block, or a programming page within an erasure block. All data within an erasure block is affected because when an erasure block is needed to hold new writes, any data in the erasure block that is still "valid" (i.e., data that has not been superseded by further data from the host) is copied to a newly-mapped unit so that the entire erasure block can be made "invalid" and eligible for erasure and reuse. If all the valid data in an erasure block that is being copied share one or more characteristics (e.g., temperature, as described in more detail below), there may be significant performance and/or wear gains from keeping this data segregated from data with dissimilar characteristics.

For instance, grouping data based on the data's "temperature" may be advantageous. The temperature of data refers to a frequency of read or write access of the data. Data that has a higher frequency of write access is said to have a higher temperature (or be "hotter") than data that has a lower frequency of write access. Data may categorized, for example, as "hot" and "cold", "hot," "warm," and "cold," or the like, based on predetermined or configurable threshold levels. Or, rather than categorizing data as "hot," "warm," and "cold," a numerical scale may be used (e.g., 1-10 or 1-100). When data needs to be written to media, either via garbage collection, host writes, or any other operation, the temperature of the data may be determined and data with similar temperatures may be grouped together using techniques of this disclosure. Depending on the workloads and observed or characterized phenomena, the system may designate any number 'N' hotness groups (e.g., if N=2, then data may be characterized as hot or cold and if N=3, then data may be characterized as hot, warm, or cold, and so forth). Within each grouping of temperature, the system may order the data so that as data becomes hotter or colder, the system is able to determine which logical data space will be added or dropped from a group, as will be described in more detail below.

As mentioned above, the higher the temperature of data, the more likely it is that the data will be rewritten again soon. By grouping data with similar temperatures, it is more likely that the data will be rewritten at a similar frequency. As such, most of the data within a garbage collection unit (a region of data storage that is a target of a garbage collection process, e.g., one or more erasure blocks) will be stale (e.g., superseded by newer host data) and the write amplification caused by garbage collection may significantly decrease. Write amplification (also referred to as "wear amplification" throughout this disclosure) refers to the amount of media data written in order to satisfy the amount of host data written. For example, in order to write 1 megabyte of host data, 0.5 megabytes may also need to be rewritten via internal garbage collection techniques in order to free up a sufficient number of erasure blocks to write the 1 megabyte of host data. Lower write amplification may extend the life and increase the performance of the device.

Figure 2:
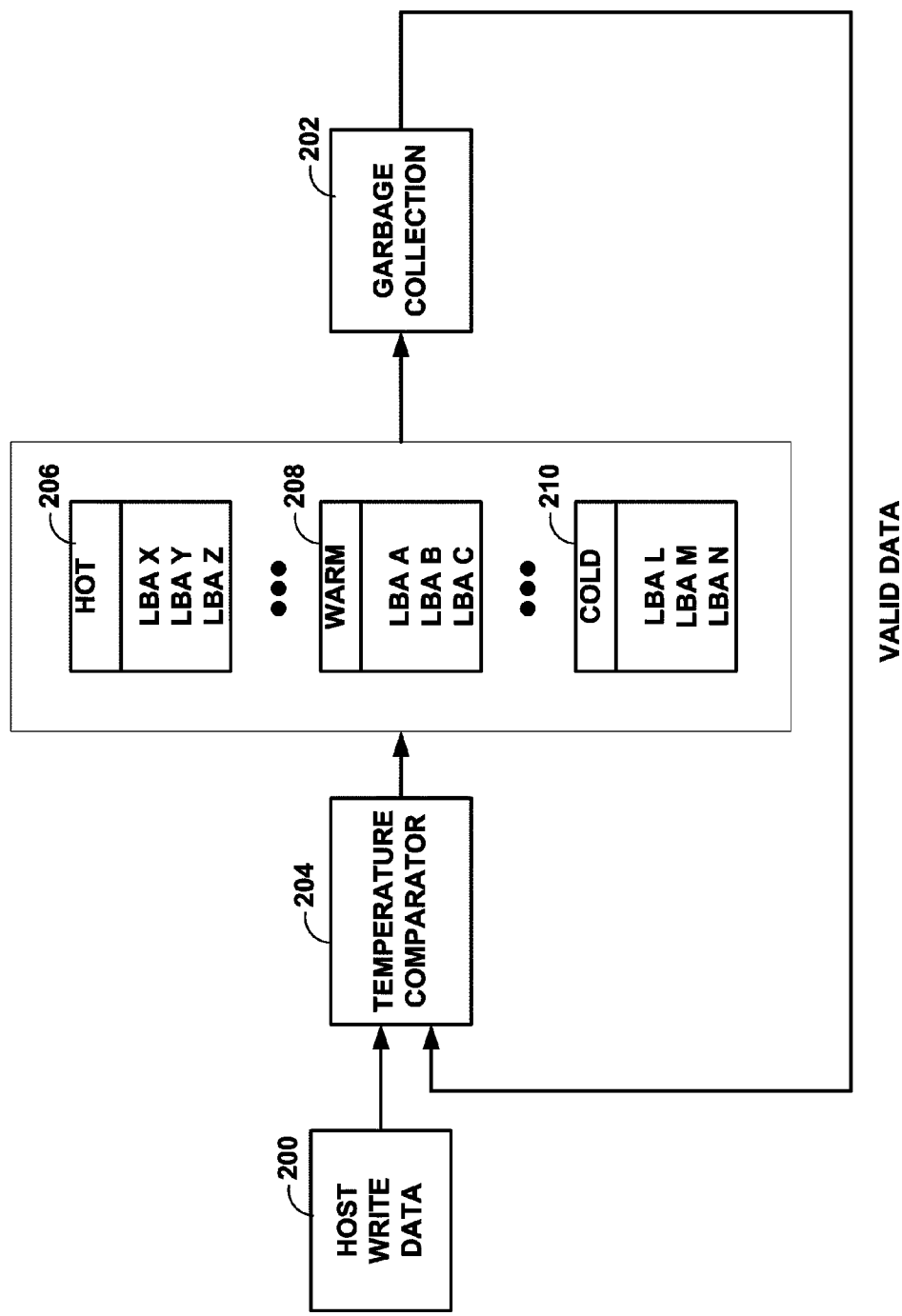
FIG. 2 is a block diagram of an example data temperature detection mechanism.

FIG. 2 is a block diagram of an example data temperature detection mechanism. In FIG. 2, the temperature of host write data 200 and the temperature of valid data collected via garbage collection operation 202 (which causes write amplification) may be compared using temperature comparator 204 and, based on the comparison, placed in a logical block address (LBA) of "hot" group 206, "warm" group 208, or "cold" group 210. Temperature comparator 204 may take into account all metrics and calculations that characterize data as hot, cold, or any value in between. Temperature comparator 204 may characterize data with numerous temperature gradients, and within a given range there may be a finer grain sorting of temperature.

One possible implementation of temperature detection utilizes implied hotness. Hotness may be implied from the fact that data being written from the host is likely to be "hot," otherwise the host would not be writing the data. Conversely, garbage collected data is likely to be "cold," otherwise the host would have previously re-written the data.

Figure 3:
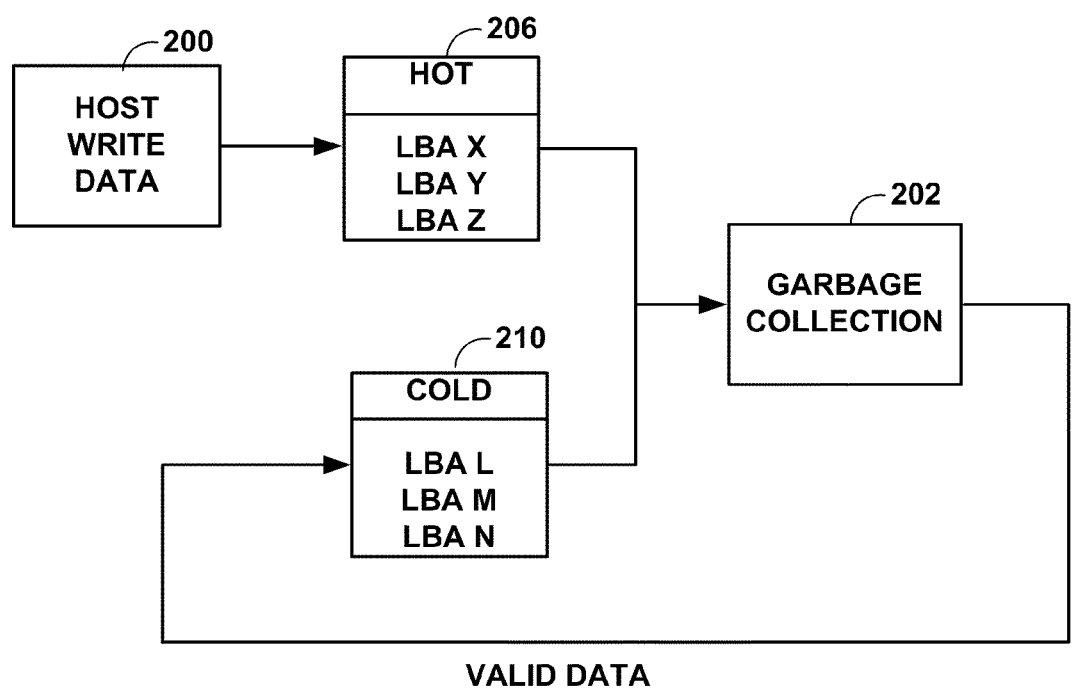
FIG. 3 is a block diagram depicting an example temperature detection technique that utilizes implied hotness.

FIG. 3 is a block diagram depicting an example temperature detection technique that utilizes implied hotness. All newly written host data 200, which is assumed to be hot based on implied hotness, is placed within "hot" group 206. In other words, the data being written by the host may be categorized as having a first designation, i.e., "hot." All valid data collected via garbage collection operation 202, which is assumed to be cold based on implied hotness, is placed within "cold" group 210. In other words, the data being collected via a garbage collection operation may be categorized as having a second designation, i.e., "cold." Numerous other categorizations are envisioned other than simply two categorizations. Although the technique shown in FIG. 3 may be expanded to incorporate other metrics for grouping data based on temperature, FIG. 3 illustrates one straightforward approach for segregating data based on the temperature of data.

Figure 4:
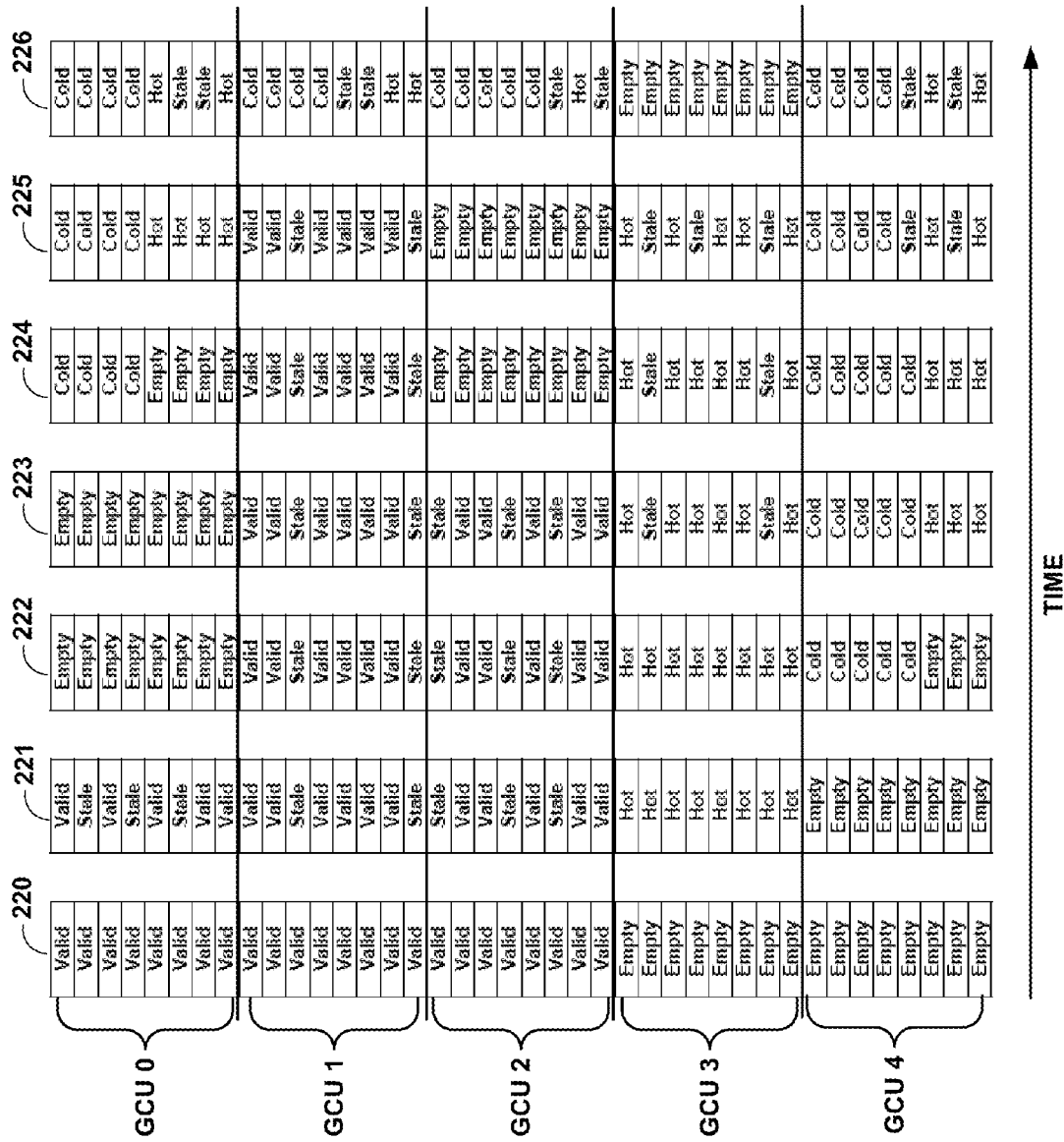
FIG. 4 is a conceptual diagram illustrating data that is not grouped according to temperature.

FIG. 4 is a conceptual diagram illustrating data that is not grouped according to temperature. In FIG. 4, five garbage collection units (GCU 0 through GCU 4) are depicted in seven states, as shown by columns 220-226, in their order in time. In initial drive state 220, GCU 0 through GCU 2 are populated with valid data and GCU 3 through GCU 4 are empty. In state 221, new host data is written to the device and the new host data, e.g., hot data, fills the formerly empty locations within GCU 3. The newly written host data causes data within several locations within GCU 0 through GCU 2 to become stale. Locations within GCU 4 remain empty in state 221.

In state 222, garbage collection occurs and the GCU with the most number of stale pages (e.g., GCU 0 in state 221), is garbage collected. The garbage collected data is assumed to be cold, and the cold data is written to GCU 4. In state 223, new host data is written, filling up the remaining empty locations within GCU 4 and causing data in GCU 2 and GCU 3 to become stale. GCU 4 now includes both cold (garbage collected) data and hot (newly written) data. The intermixing of cold and hot data occurs after each garbage collection operation.

In state 224, garbage collection occurs and the GCU with the most number of stale pages (e.g., GCU 2 in state 223), is garbage collected. The garbage collected data is assumed to be cold, and the cold data is written to empty GCU 0. In state 225, new host data is written, filling up the remaining empty locations within GCU 0. The newly written host data causes data in GCU 1, GCU 2, and GCU 3 to become stale. State 226 depicts the drive once steady-state is reached. In state 226, i.e., steady state, GCU 0, GCU 1, GCU 2, and GCU 4 include both hot and cold data. The mixing of data temperatures may cause write amplification and decrease the endurance and performance of the drive.

Figure 5:
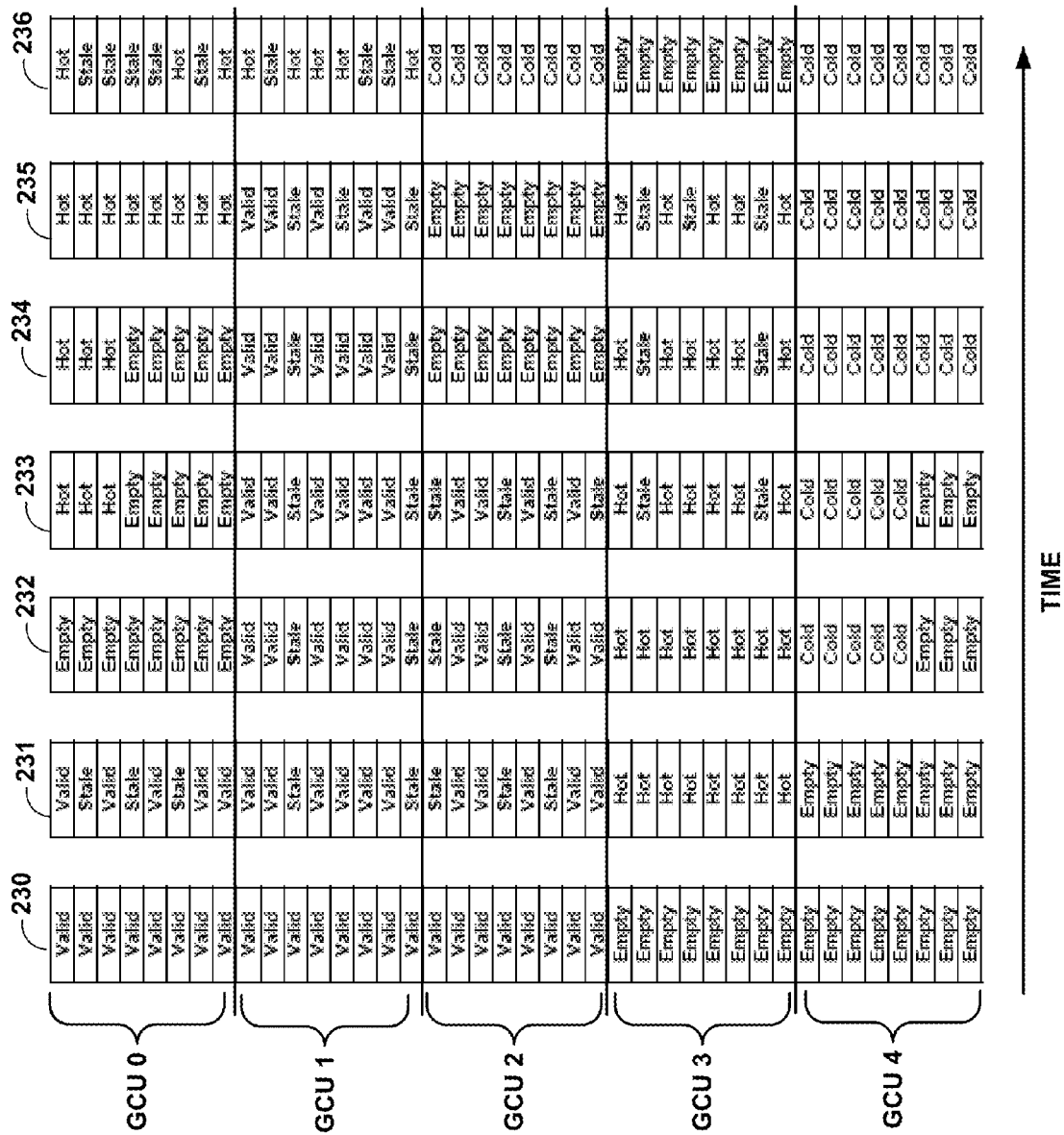
FIG. 5 is a conceptual diagram illustrating data that is grouped according to temperature, in accordance with certain techniques of this disclosure.

FIG. 5 is a conceptual diagram illustrating data that is grouped according to temperature, in accordance with certain techniques of this disclosure. In FIG. 5, five garbage collection units (GCU 0 through GCU 4) are depicted in seven states, as shown by columns 230-236, in their order in time. States 230-232 in FIG. 5 are similar to states 220-222 in FIG. 4 and, as such, will not be described in detail again. In state 233 of FIG. 5, new host data is written to a previously designated "hot" GCU, e.g., GCU 0. This is in contrast to state 223 of FIG. 4 where host (i.e., hot) data is written to a GCU that includes cold data, e.g., GCU 4 of FIG. 4.

In state 234 of FIG. 5, garbage collection occurs and the GCU with the most number of stale pages (e.g., GCU 2 in state 233), is garbage collected. The garbage collected data is assumed to be cold, and the cold data is written to a previously designated "cold" GCU, e.g., GCU 4. In state 235, new host data is written, filling up the remaining empty locations within a designated "hot" GCU, e.g., GCU 0, and causing data in GCU 1 and GCU 3 to become stale. In this manner, cold (garbage collected) data is segregated from hot (newly written) data. The segregation of hot and cold data will continue throughout the life of the device.

State 236 depicts the drive once steady-state is reached. In state 236, i.e., steady state, data is segregated based on temperature. For example, GCU 2 and GCU 4 contain only cold data, while GCU 0 and GCU 1 contain either hot data or stale data. The next garbage collection operation (not shown) would again select the GCU with the most number of stale pages. As shown in FIG. 5, GCU 0 has the most number of stale pages, namely five, at the time of garbage collection. This is contrasted against FIG. 4, where GCU 0, GCU 1, and GCU 4 each have two stale pages at the time of garbage collection. Thus, using the techniques of this disclosure, write amplification is reduced by a factor of 2.5 (five pages compared to 2 pages). Consistently achieving a reduction in write amplification of 2.5× may translate into about a 2.5× increase in lifetime and write performance.

Figure 6:
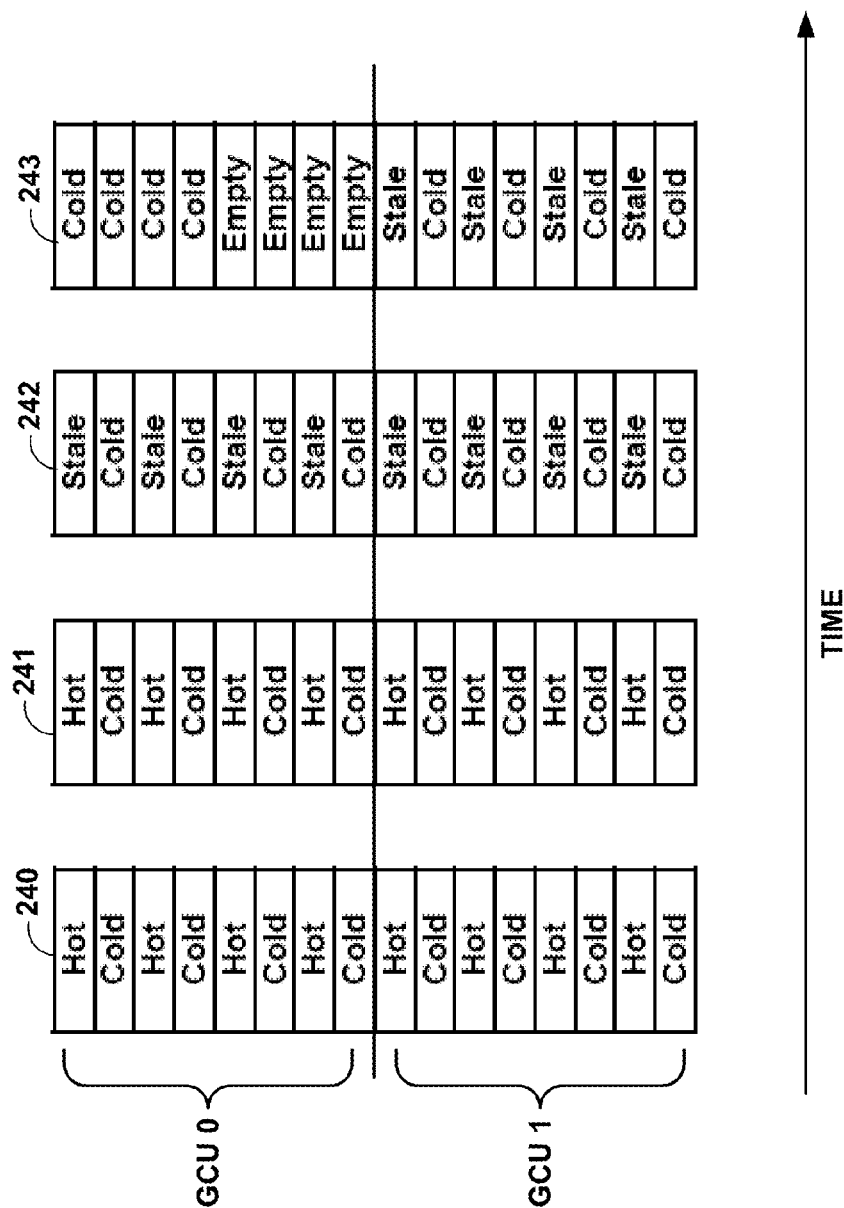
FIG. 6 is a conceptual diagram illustrating write amplification when data is not grouped according to temperature.

FIG. 6 is a conceptual diagram illustrating write amplification when data is not grouped according to temperature. In FIG. 6, two garbage collection units (GCU 0 and GCU 1) are depicted in four states, as shown by columns 240-243, in their order in time. State 240 depicts an initial drive state in which GCU 0 and GCU 1 have equal amounts of hot and cold data, with intermixing of data temperatures. State 241 depicts the steady state condition of the drive, illustrating intermixing of data temperatures.

In state 242, the hot data is reprogrammed, i.e., rewritten by the host, resulting in equal amounts of cold data and stale data in GCU 0 and GCU 1. In state 243, garbage collection occurs and the GCU with the most number of stale pages is garbage collected. As seen in state 242, there is an equal amount of stale data and valid data in GCU 0, thus write amplification is increased by four data groups (i.e., four locations of data in GCU 0 must be copied to another location within GCU 0). State 243 depicts the four cold data groups rewritten to GCU 0 via the garbage collection techniques.

Figure 7:
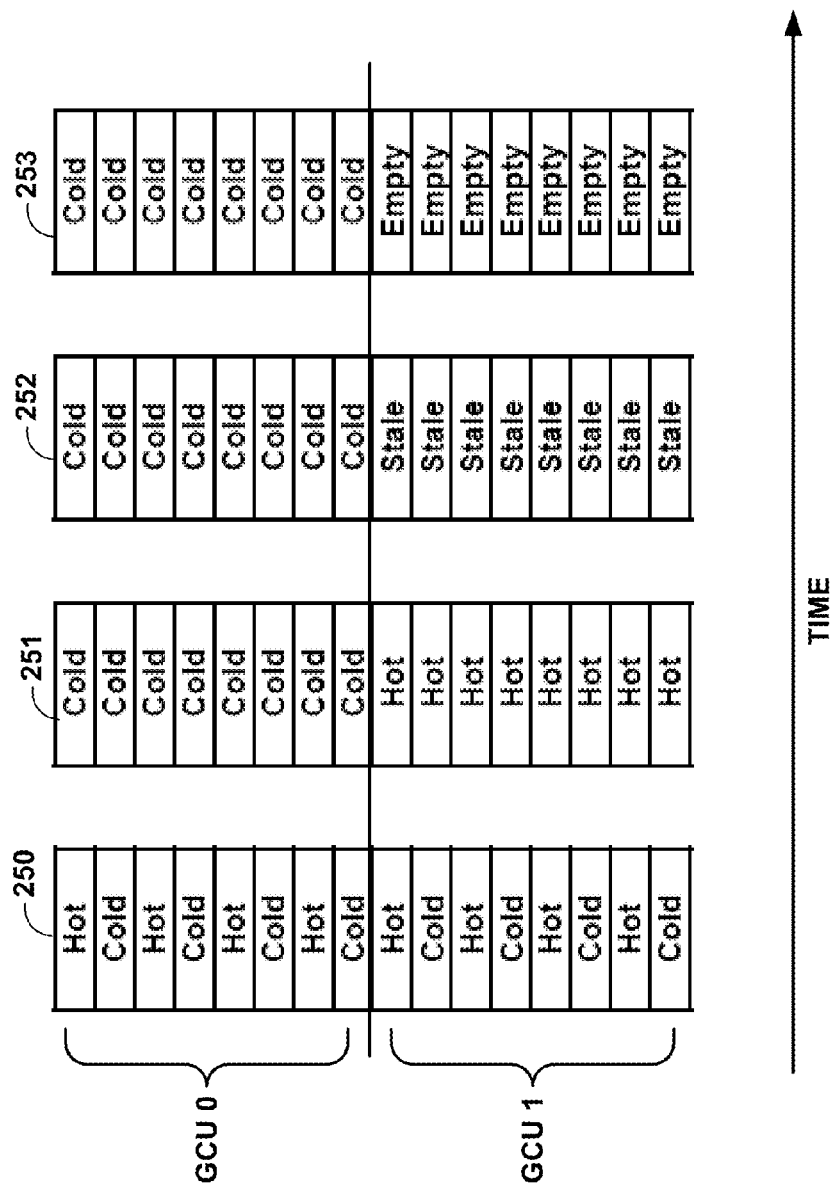
FIG. 7 is a conceptual diagram illustrating write amplification when data is grouped according to temperature, in accordance with certain techniques of this disclosure.

FIG. 7 is a conceptual diagram illustrating write amplification when data is grouped according to temperature, in accordance with certain techniques of this disclosure. In FIG. 7, two garbage collection units (GCU 0 and GCU 1) are depicted in four states, as shown by columns 250-253, in their order in time. State 250 depicts an initial drive state in which GCU 0 and GCU 1 have equal amounts of hot and cold data, with intermixing of data temperatures. State 251 depicts the steady state condition of the drive, illustrating segregation of data temperatures, in particular, cold data in GCU 0 and hot data in GCU 1.

In state 252, when the hot data is reprogrammed, i.e., rewritten by the host, all of the data within GCU 1 becomes stale. In state 253, garbage collection occurs and the GCU with the most number of stale pages is garbage collected. However, in this case, garbage collection is "free." That is, because there is no valid, e.g., cold, data remaining within GCU 1 that needs to be copied elsewhere (due to the fact that data was segregated by temperature), there is no increase in write amplification during garbage collection. In contrast to FIG. 6 where there is a half GCU empty (GCU 0), FIG. 7 depicts a full GCU empty (GCU 1) available for new writes, or rewrites via garbage collection, achieved using the techniques of this disclosure.

Figure 8:
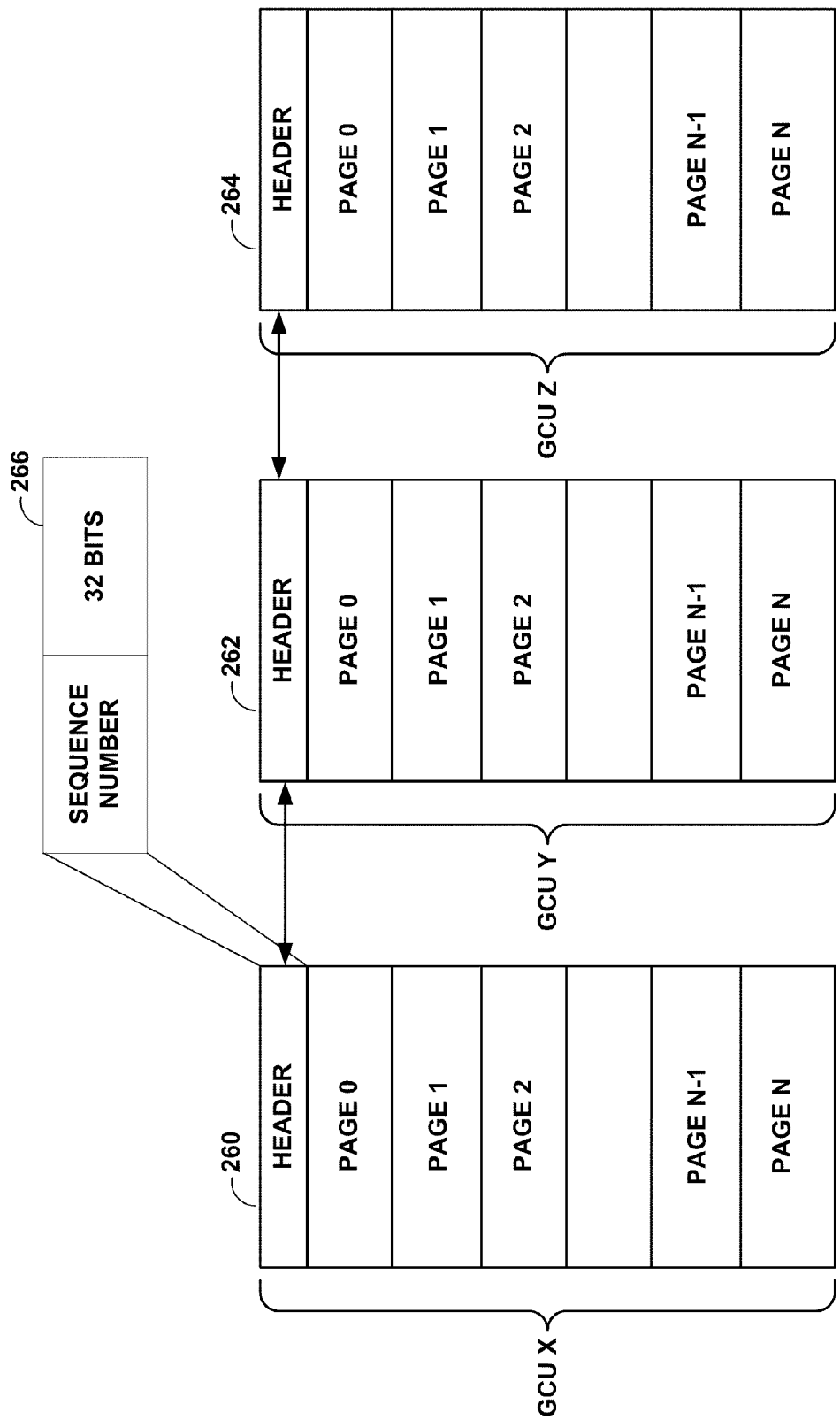
FIG. 8 is a conceptual diagram depicting example garbage collection units that include embedded sequence counters for temperature detection techniques in accordance with this disclosure.

FIG. 8 is a conceptual diagram depicting example garbage collection units that include embedded sequence counters for temperature detection techniques in accordance with this disclosure. Although implied hotness may provide a reasonably accurate estimation of the likelihood of data being rewritten, implied hotness may not be sufficient on its own to detect temperature. For example, using only implied hotness for temperature detection, if all the "hot" data units within the same GCU are rewritten, then some "hot" data in other GCUs will be miscategorized as "cold" data.

Figure 9:
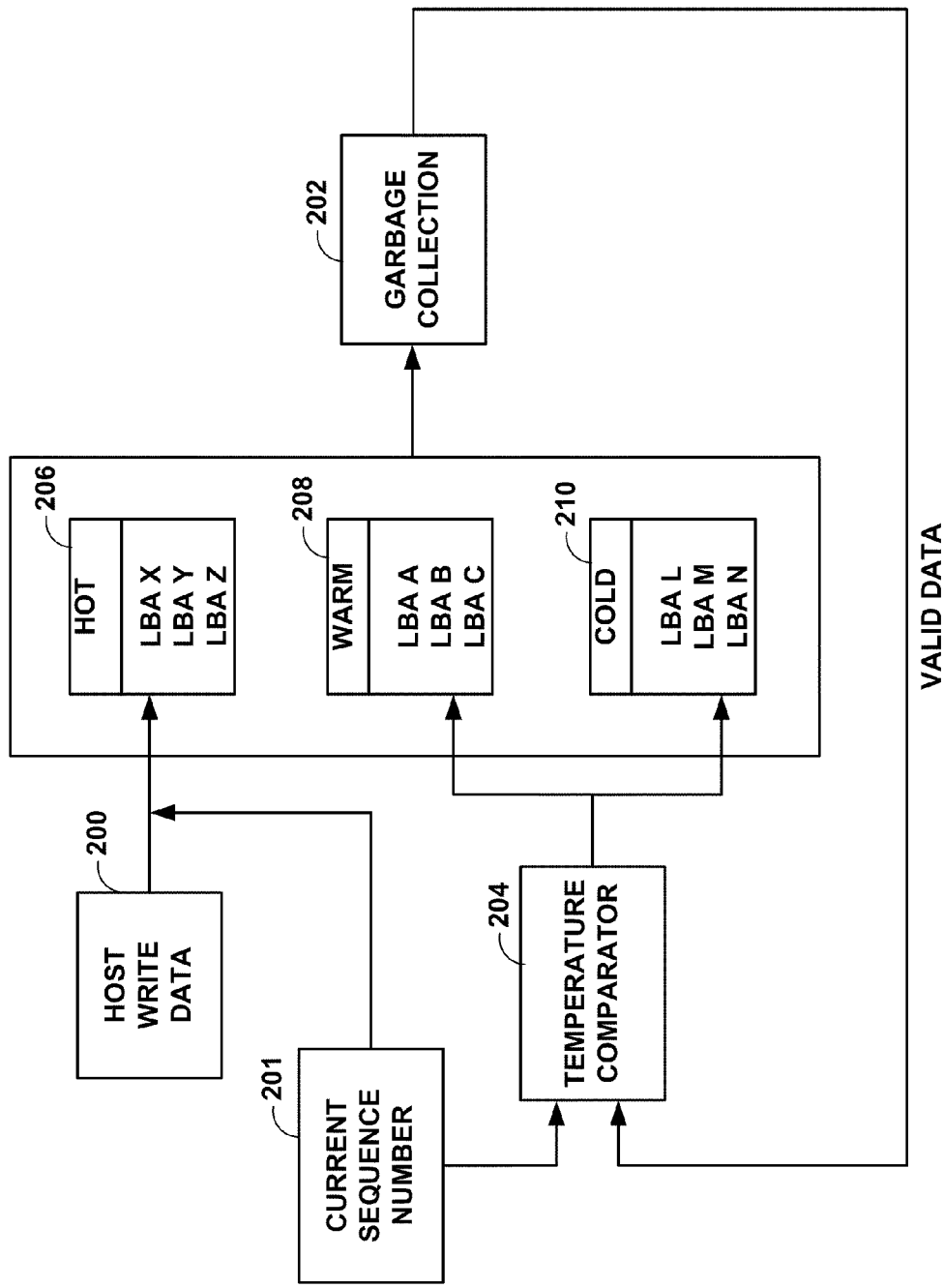
FIG. 9 is a block diagram depicting an example temperature detection technique that utilizes sequence numbers along with implied hotness to determine data temperature.

To prevent this miscategorization, a sequence number (e.g., timestamp or monotonically increasing number based on the number of host writes) may be used to predict a better relative temperature for data being recycled, as shown in FIG. 8. When data is being written to a GCU, the current sequence number may be appended to the data. When data is recycled, the sequence number associated with the data may be used by the hotness detector to pool items that are being recycled with other items of a similar sequence number. If the recycled sequence number is within a certain proximity, e.g., a predetermined threshold value or range, to the current sequence number being assigned to the data being written by the host, then the data being recycled may be considered warm, as shown in FIG. 9 below. However, if the recycled sequence number is not within a certain proximity, e.g., a predetermined threshold value or range, of the current sequence number, then the data being recycled may be considered cold data. In this manner, a sequence number may provide better granularity of temperature for data being recycled with a minimal cost.

FIG. 8 depicts three example garbage collection units, namely GCU 260, GCU 262, and GCU 264, each GCU having N pages and header 266. Each header 266 includes a 32-bit sequence number. The cost of including a 32-bit sequence number per GCU of size 256 kibibytes (KiB) would be about 0.001% of the overall storage of the GCU. With larger GCUs, the percentage of the counter relative to the size of the GCU would decrease.

FIG. 9 is a block diagram depicting an example temperature detection technique that utilizes sequence numbers along with implied hotness to determine data temperature. All data includes a sequence number, e.g., a timestamp, as shown and described above with respect to FIG. 8. In FIG. 9, a current sequence number 201 is appended to host write data 200. All newly written host data 200, assumed to be hot based on implied hotness, is placed within "hot" group 206. Current sequence number 201, along with all valid data collected via garbage collection operation 202, are input into temperature comparator 204. Temperature comparator 204 compares current sequence number 201 to the sequence number of the valid data recycled via garbage collection operation 202 and determines a difference value between the sequence numbers being compared. If the difference value between the sequence number of the valid, garbage collected data and current sequence number 201 is within a predetermined range (e.g., set by a user or a default setting), then the valid data being recycled may be considered warm and placed within "warm" group 208. However, if the difference value between the sequence number of the valid, garbage collected data and current sequence number 201 is outside of the predetermined range, then the data being recycled may be considered cold data and placed within "cold" group 210. Thus, the valid, garbage collected data recycled via a garbage collection operation is categorized as having a second designation, e.g., "warm" or "cold," based on the determined difference value. In this manner, a sequence counter may provide better granularity of temperature for data being recycled via garbage collection operations. In some example implementations, the sequence numbers of the data may be updated after being categorized as having a second designation such as "warm" and "cold."

In another example implementation, new host write data may be categorized into one of two or more designations. In such an example, temperature comparator 204 may compare current sequence number 201 assigned to the host write data 200 to a sequence number previously assigned to previously written host data. The previously written host data is superseded by newly written host data 200. As such, the previously written host data is no longer valid data and will not be garbage collected. Temperature comparator 204 may determine a difference value between current sequence number 201 and the sequence number previously assigned to the previously written host data. Based on the difference value, the data being written by the host may be categorized as having a first designation.

For instance, if the difference value between the current sequence number 201 and the sequence number previously assigned to the previously written host data falls within a first predetermined range, then the newly written data may be categorized as "hot," for example. The newly written data may be categorized as "hot" because the first predetermined range indicates a predetermined closeness in time between writes. If the difference value between the current sequence number 201 and the sequence number previously assigned to the previously written host data falls outside of the first predetermined range, then the newly written data may be categorized as "warm," for example, indicating that there is more time between writes. In other examples, rather than just having a first predetermined range, there may be a second predetermined range, a third predetermined range, and so forth, in order to provide for more finer granularity in categorizing the heat of the host write data. It should be noted that these techniques of categorizing the newly written host data may be combined with the techniques for categorizing the valid data being collected via a garbage collection operation.

Figure 10:
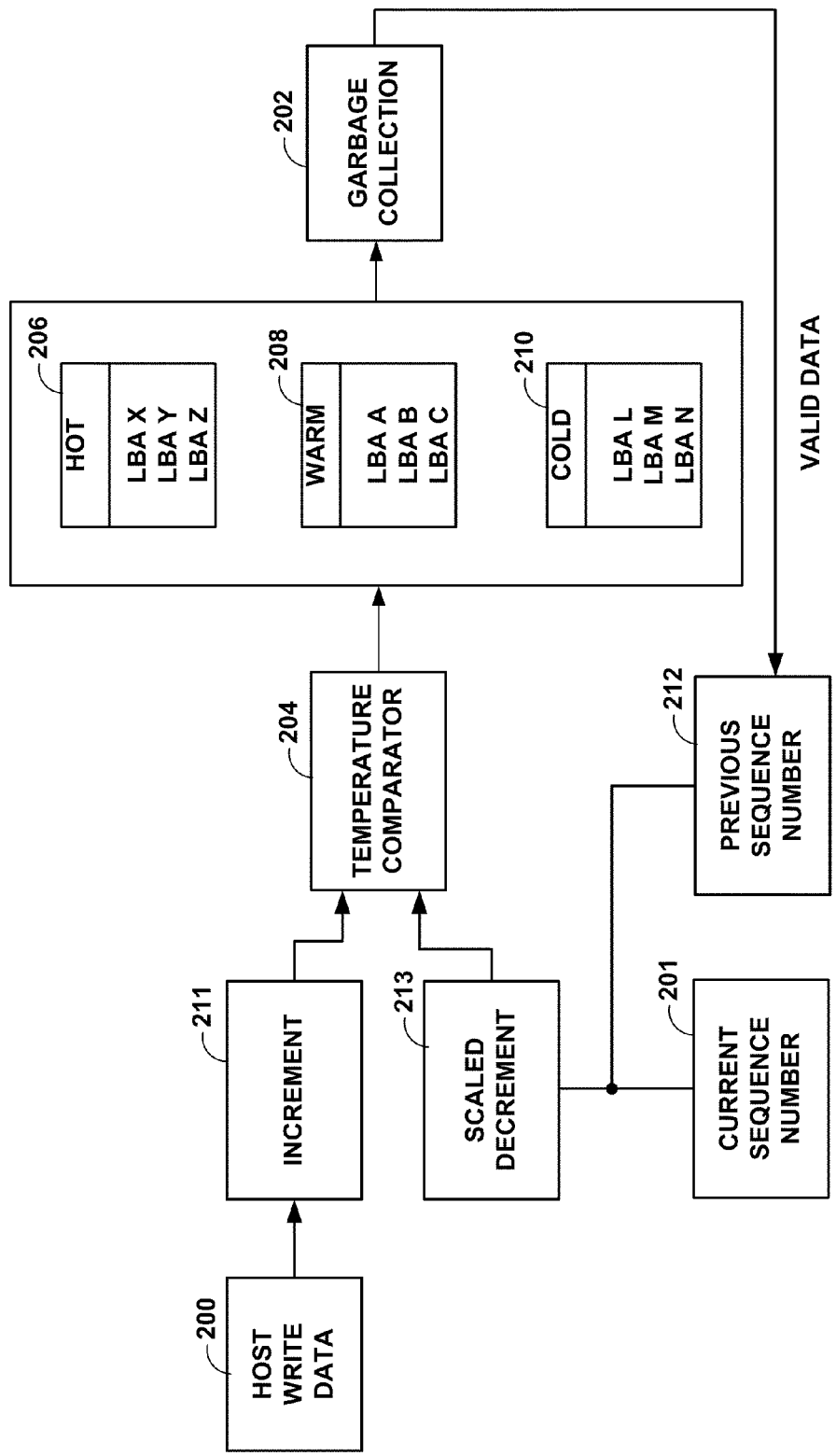
FIG. 10 is a block diagram depicting another example temperature detection technique that utilizes sequence numbers along with implied hotness to determine data temperature.

FIG. 10 is a block diagram depicting another example temperature detection technique that utilizes sequence numbers along with implied hotness to determine data temperature. In FIG. 10, a hotness indicator, e.g. small counter, is stored with each LBA range. The LBA range may be, for example, a single LBA, groups of LBAs, e.g., 8 LBAs in a logical page, or even larger groups. The hotness indicator may be small to conserve space, e.g., 4 bits per group.

There may be dynamic ranges, based on counter values, which indicate whether the data is "hot," warm, or "cold." It should be noted that the dynamic ranges may be adjusted to provide for increased granularity of more than three temperatures. By way of specific example, with a 4-bit counter, the "hot" group 206 may start with any sequence number greater than 12, but then may decrease to greater than 10 if there are not enough elements in the temperature pool. The sequence number may be incremented at increment block 211 on every host write 200, as there is some level of hotness if the host is writing data. When data are garbage collected at garbage collection operation 202, the difference in previous sequence counter 212 and current sequence counter 201 may determine scaled decrement 213 for the hotness counter.

If the previous and current sequence numbers are within a predetermined range, then the hotness counter may not decrement at all, e.g., when extremely hot data is packed with other hot data and the GCU is recycled very quickly. If the previous and current sequence numbers are outside the predetermined range, but still close together, the counter may decrement by one. If the previous and current sequence numbers are outside the predetermined range and not close together, then the scaled decrement may take away more two or more counts from the hotness counter. The scaled decrement may create a hotness indicator that tracks the hotness of the recent activity and that limits the memory of the system, which is beneficial to tracking hotness. Tracking the hotness of recent activity and limiting the memory of the system is beneficial because hotness may be more useful within a certain time period than over the entire lifetime of the product.

The techniques described above detail several methods that may be implemented in hardware, software, firmware, or any combination thereof, in order to determine and compare the temperature of data. In accordance with further techniques described in this disclosure and as will be described in more detail below, an SSD may be separated into two or more data storage areas, with each of the two or more data storage areas being provided an amount of over-provisioning. Data to be written by a host and/or data to be copied internally within the SSD via garbage collection techniques may be categorized based on one or more characteristics of the data, and then the data may be stored in one of the two or more data storage areas of the SSD based on the categorization. For example, data may be characterized based on a frequency of write access of the data. Data that has a higher frequency of write access may be stored in a first data storage area, and data that has a lower frequency of write access may be stored in a second data storage area. In some examples, the first data storage area for storing data having a higher frequency of write access may be provided with more over-provisioning than the second data storage area for storing data having a lower frequency of write access.

Throughout the remainder of this disclosure, the frequency of write access of data will be referred to in terms of the characteristic of temperature, e.g., heat. Data that is written or updated frequently is considered "hotter" than data that is written once or updated infrequently. Conversely, data that is written once or updated infrequently is "colder" than data that is written or updated frequently. As such, data categorized based on temperature characteristics may, at the most basic level, be categorized as "hot" data or "cold" data. Of course, the data need not be simply characterized as "hot" or "cold." Rather, numerous degrees of heat beyond simply "hot" or "cold" may be applied to the data to further refine the characterizations. For example, there may be three levels of heat, ten levels of heat, one hundred levels of heat, etc.

Figure 11:
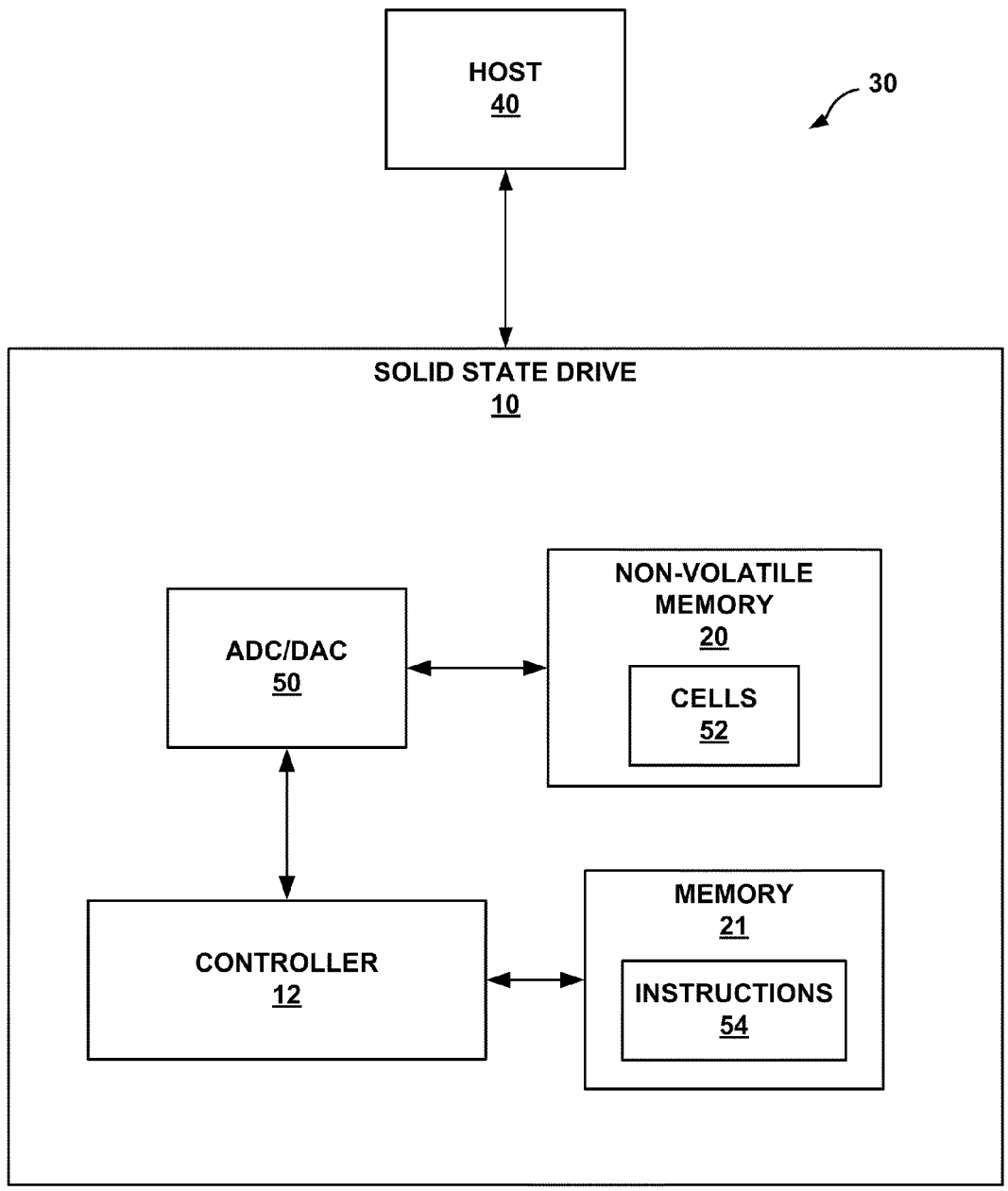
FIG. 11 is a block diagram illustrating an example system including the SSD of FIG. 1.

FIG. 11 is a block diagram illustrating an example system including the SSD of FIG. 1. In FIG. 11, system 30 is shown including a host 40 and solid state drive 10. Host 40 may comprise a wide variety of devices, such as one or more of a personal digital assistant (PDA), a workstation, a personal computer, a laptop computer, a mobile telephone, a media player, or any other device capable of transmitting data to or receiving data from a storage media. Host 40 may communicate with solid state drive 10 via a host interface (not depicted). Solid state drive 10 further includes controller 12, non-volatile memory 20, e.g., NAND flash memory, memory 21, and analog-to-digital converter (ADC)/digital-to-analog converter (DAC) 50. Non-volatile memory 20 is comprised of a plurality of cells 52 with each cell 52 configured to store electric charge corresponding to a value comprising a certain number of bits.

Controller 12 may be configured to perform a number of tasks, including executing instructions 54 stored in memory 21 that allow controller 12 to read data from and write data to non-volatile memory 20, via ADC/DAC 50. Controller 12 comprises hardware, such as one or more processors, microprocessors, digital signal processor (DSPs), application specific integrated circuits (ASICs), field programmable gate arrays (FPGAs), or any other equivalent integrated or discrete logic circuitry for performing the functions ascribed to controller 12.

For example, when host 40 transmits digital signals comprising information to be stored in solid state memory 10 and, in particular, in cells 52 of non-volatile memory 20, controller 12 controls ADC/DAC 50 to convert the digital signal to analog signals, e.g., voltage levels. ADC/DAC 50 may have a resolution that is greater than, e.g., a greater number of quantization levels, a resolution of the particular cells (e.g., a number of possible bit values that can be represented by the particular cells) of the data flash. For example, if non-volatile memory 20 is a 3-bit MLC flash, the ADC/DAC 50 may have more than $2^3$, or eight, quantized levels, to represent one of the three-bit combinations, e.g., codewords, of "111," "110," "101," "100," "011," "010," "001," or "000." ADC/DAC 50 may divide the three-bit combinations into most-significant bits (MSBs) and least-significant bits (LSBs) and program the MSBs and LSBs separately. For example, ADC/DAC 50 may convert the MSBs of a three-bit combination to a quantized voltage level. Then, controller 12 applies the quantized voltage level to one of cells 52, thereby storing electric charges representing the MSBs of the three-bit combination. In particular, controller 12 causes electric charges representing the bit combination to be stored on the floating gate of a cell of non-volatile memory 20. After programming the MSBs, ADC/DAC 50 may perform a similar operation for the LSBs of the bit combinations. In this manner, controller 12 may progressively program bits from coarse voltage to finer voltage over time, for example, in different programming steps.

Similarly, when host 40 transmits a request for information previously stored in solid state drive 10 and, in particular, in cells 52 of non-volatile memory 20, controller 12 controls ADC/DAC 50 to convert the particular voltage level representing the bit combination stored on the floating gate of a cell of non-volatile memory 20 to a digital signal. ADC/DAC 50 quantizes an estimate of the amount of charge on the floating gate of the cell to a particular voltage level that represents a bit combination. Controller 12 then transmits the bit combination to host 40. In this manner, host 40 may read data from and write data to solid state device 10.

Using the techniques of this disclosure, controller 12 may estimate the "temperature" or "heat" of the data being rewritten by host 40 as well as the heat of the data being copied internally via garbage collection techniques. As indicated above, segregating data based on one or more characteristics of the data, e.g., the "temperature" of the data, may provide wear gains over the life of the SSD. Controller 12 may estimate the "heat" of data being rewritten by host 40 any number of ways. For example, controller 12 may assume the maximum possible heat of this data. That is, controller 12 may set an internal bookkeeping heat estimate for data written by the host to a maximum value.

In another example, controller 12 may calculate an estimate of the heat of data by a mixture of the estimated current heat, which is inversely proportional to how long it has been since the data was last updated, and the previously estimated heat. In such an example, the heat may be calculated as follows:

$$T_k[i] = \left( \frac{\alpha}{T_{k-1}[i]} + (1-\alpha) \cdot (t_k[i] - t_{k-1}[i]) \right)^{-1} \quad (1)$$

where T is the temperature, or heat, of the data for map unit [i], where ($0 \leq \alpha < 1$) represents the exponential "memory" of past temperature (e.g., a weighting factor in favor of the previous heat estimate instead of the time since the last write), and where $t_k$ is the time that the host data of interest was written the $k^{th}$ time.

In another example, controller 12 may calculate the heat of data by a mixture of maximum heat (assumed so, since host 40 just rewrote the data) and the heat estimate from the prior time the host wrote the data. In such an example, the heat may be calculated as follows:

$$T_k[i] \alpha^{(t_k[i]-t_{k-1}[i])} \cdot T_{k-1}[i] + (1-\alpha) \cdot T_{max} \quad (2)$$

In equation (2) above, the exponential term ($t_k[i]-t_{k-1}[i]$) is used to cause the previous estimate to "cool" based on the amount of time that elapsed since the previous estimate.

Controller 12 may also estimate the "heat" of data that is about to be copied from at least a first garbage collection unit at least a second garbage collection unit via garbage collection techniques (in contrast to data being rewritten by the host, as described above). A garbage collection unit is a region of data storage that is a target of a garbage collection process (e.g., one or more erasure blocks, one or more tracks of a magnetic disk, one or more die, one or more mappable units, and the like). Controller 12 may estimate the heat of data that is about to be copied via garbage collection techniques in any number of ways, including, but not limited to the following:

(a) 1/(time since the data of interest was last mapped, i.e., written to the erasure block that is being garbage-collected);

(b) 1/(time since the erasure block containing a mapped unit was erased);

(c) 1/(time since the erasure block containing the data of interest began to be filled); and (d) The fraction of the erasure block that has already been invalidated by host writing, multiplied by (b) or (c) above. It should be noted that being garbage-collected might indicate minimal heat.

"Time," as used above, can be calculated in a number of ways and used to determine the heat of data. "Time" may be calculated, for example, as follows: power-on time (time that the SSD is aware of, e.g., when the electronics were powered up); real-time, which includes powered-off time; the number of mapping blocks written by the host; and the number of mapping blocks written or allocated inside the SSD.

Using the techniques described above, the temperature of data being rewritten by the host and the temperature of data that is about to be copied via garbage collection technique may be estimated. If controller 12 of SSD 10 maps pages within erasure blocks, and not erasure blocks, non-constant wear amplification may occur. Wear amplification caused by the ongoing remapping of pages of data is bounded as follows for uniform and independently-selected mappable locations:

$$WA < 1 + \frac{1}{Overprovisioning} \quad (3)$$

If SSD 10 is divided into subsets, the wear amplification, WA, of each subset depends on the over-provisioning of that subset of the SSD.

Figure 12:
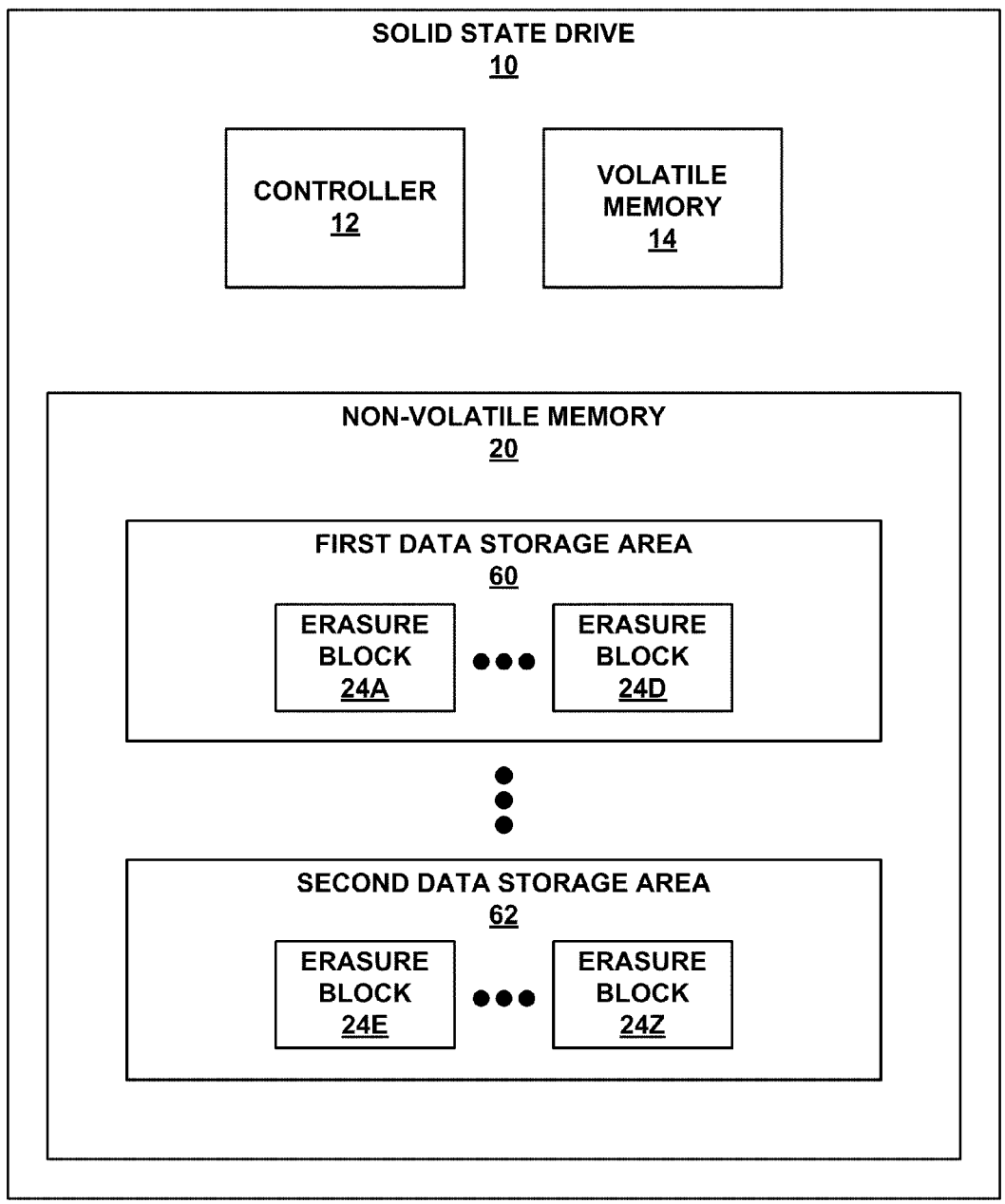
FIG. 12 is a block diagram illustrating the example SSD of FIG. 1 configured in accordance with various techniques of this disclosure.

FIG. 12 is a block diagram illustrating the example SSD of FIG. 1 configured in accordance with various techniques of this disclosure. Using various techniques of this disclosure, controller 12 provides SSD 10, in particular non-volatile memory 20, with two or more subsets, or data storage area. FIG. 12 depicts two data storage areas, namely first data storage area 60 and second data storage area 62. Controller 12 provides a first amount of over-provisioning to first data storage area 60 and a second amount of over-provisioning to second data storage area 62. In particular, controller 12 provides a first amount of over-provisioning to first data storage area 60 by providing a number of erasure blocks 24 to first data storage area 60 and advertising to a host, for example, a smaller number of erasure blocks, the difference in bytes between the advertised and provided amounts being the amount of over-provisioning in first data storage area 60. Similarly, controller 12 provides a second amount of over-provisioning to second data storage area 62 by providing a number of erasure blocks 24 to second data storage area 62 and advertising to the host a smaller number of erasure blocks, the difference in bytes between the advertised and provided amounts being the amount of over-provisioning in the second data storage area 62.

For example, in FIG. 12, controller 12 has provided four erasure blocks, namely erasure blocks 24A-24D, to first data storage area 60, and controller 12 has provided twenty two erasure blocks, namely erasure blocks 24E-24Z, to second data storage area 62. Assume that both first data storage area 60 and second data storage area 62 advertise to a host the capability to store the amount of bytes contained in two erasure blocks. Hence, second data storage area 62 has more over-provisioning than first data storage area 60 because second data storage area 62 has a higher ratio of unadvertised-to-total erasure blocks (20/22) than that of first data storage area 60 (2/4). Of course, the number of erasure blocks shown in first and second data storage areas 60, 62 in FIG. 12 is only for the purposes of illustration. First and second data storage areas 60, 62 may have a much larger number of erasure blocks provided for over-provisioning.

Controller 12 categorizes data based on a characteristic of the data, e.g., temperature, and then stores the data in one of the data storage areas based on the categorization. For example, in FIG. 12, because second data storage area 62 has more over-provisioning than first data storage area 60, controller 12 may store hotter data in second data storage area 62 to take advantage of the reduced wear amplification that results from the increased over-provisioning of second data storage area 62. Controller 12 may store colder data in first data storage area 60.

After identifying the temperature of data and then segregating the data of different temperatures into different data storage areas, e.g., erasure blocks, advantageous garbage collection techniques may then be utilized in order to provide over-provisioning for the different storage areas to improve wear amplification. In a typical garbage collection technique, the controller, e.g., controller 12, selects erasure blocks with higher hole-density (i.e., having lower valid data density) for garbage collection. If, using the techniques of this disclosure, controller 12 instead garbage collects cold data into well-packed cold erasure blocks even when the erasure blocks are observed to have a lower hole-density (i.e., still having higher valid-data density) than at the point at which hot data will be garbage-collected, some erasure blocks will be made available for rewrites that are unlikely to be needed for rewrites of this cold data in the near future.

By "prematurely" garbage collecting cold data (i.e. garbage-collecting cold data with a lower hole-density than hot data that is eligible for garbage collection), controller 12 makes available to the system more over-provisioning for hot data. The increased over-provisioning reduces the wear amplification caused by the hot data, thereby allowing later performance improvement in the portion of the SSD that must copy data during garbage collection. Controller 12 may use one or more factors to determine the erasure blocks from which to garbage collect. Example factors include, but are not limited to, the following: the amount of wear of the erasure block, e.g., wear as indicated by the remaining erasure counts; the amount of invalid data, e.g., data that has already been mapped to newer locations; and the temperature of the data. Regarding the temperature of the data, in some examples, the data in an erasure block may have different temperatures, but the heat of all data in a page may be defined to be the same. That is, controller 12 may estimate heat on every logically-mappable unit, or aggregate heat estimates. Depending on the implementation, an aggregated region may be an EB, a page, or may be the smallest-possible separately-mapped unit, the logical mapping unit (whether it is compressed or not).

According to the techniques of this disclosure, controller 12 may select a set of erasure blocks from which to garbage collect that minimizes wear amplification. These techniques may improve performance because they minimize the amount of data to be copied in order to garbage-collect an erasure block. For the purposes of the description below, it is assumed that there is a set of available-to-write-into erasure blocks at all times (or, at a minimum, negligibly-populated erasure blocks), and that the garbage collection process is responsible for keeping this set populated with a non-zero number of erasure blocks so that a data allocator can place newly-written host data into an available location.

Controller 12 may analyze an estimated 2-D probability density function, f(T, D), of garbage-collectable erasure blocks and determine the values of (T, D) that, when garbage-collected, minimize the total wear induced during ongoing operation, including this garbage collection. The independent variables T, D of f(T,D) are as follows: T is the estimated temperature of data (approximately the frequency of rewrite of an average valid page in an erasure block at (T,D), equal to 1/time until the average valid page rewrite); and D ("deadness") is the portion of an erasure block that no longer contains valid data (e.g., at the moment an erasure block is finished filing with completely valid data, the erasure block has a deadness of zero).

The total amount of wear on erasure blocks may be defined as follows:

$$TotalWear = \sum_T WearAmplification(T) \cdot WriteFrequency(T) \quad (4)$$

In order to minimize TotalWear, a different deadness threshold D is selected for each T, and WearAmplification(T) is back-computed for a given level of over-provisioning. The variable WearAmplification(T) of equation (4) is equal to NPPEB/D(T). The appropriate value of D(T) for each binned value of temperature T (indexed by i) may be found by solving equation (5) below for D[i] using analytical or computational/iterative methods:

$$\frac{D[i] - NPPEB}{NPPEB} = e^{\frac{EB[i] \cdot D[i]}{K[i]}} \quad (5)$$

where D[i] is the approximate level of "deadness" that will be selected for garbage collection for a particular temperature, T, NPPEB is the number of pages per erasure block, EB[i] is the number of erasure blocks for a particular temperature T[i], and K[i] is the number of mapped pages of host data at temperature T[i]. It should be noted that, due to updates to heat estimates, some of the mapped pages K[i] of host data might be moved into other pages K. This movement means either that the over-provisioning in the $i^{th}$ temperature may be incrementally affected (e.g., over-provisioning may be reduced in the $i^{th}$ temperature, thereby increasing wear amplification caused by hotter data), or that more erasure blocks may need to be allocated to the set of erasure blocks EB in the $i^{th}$ temperature in order to allow the same deadness threshold D to be used without affecting over-provisioning in the $i^{th}$ temperature.

Stated another way, controller 12 may divide temperature T into bins, the bins represented by indices [i]. Then, controller 12 may adjust EB[i], the number of erasure blocks for a particular temperature T[i], in order to adapt to changing K[i], the number of mapped pages of host data at temperature T[i]. In this manner, controller 12 minimizes the total amount of wear on erasure blocks, TotalWear, in equation (4). In some examples, controller 12 may modify deadness threshold D[i] for each [i] and allow garbage-collected erasure blocks to be used in bins where the erasure blocks are most needed, thereby allowing controller 12 to allocate over-provisioning to the bins that need more erasure blocks. In other examples, controller 12 may modify the over-provisioning associated with each bin [i] by adjusting the largest number of EB[i] that is allowed before bin [i] is selected for garbage collection.

In either example, controller 12 may use a multi-variate minimization technique to determine a new D[i] or new EB[i], depending on method chosen above. Or, controller 12 may determine the D[i] that are a function of T[i] that will minimize equation (4). In addition, perturbation, adaptive processing, or similar techniques, may be used to determine optimal choices to minimize equation (4).

The variable WriteFrequency(T) of equation (4) may be estimated as follows:

$$\text{WriteFrequency}(T) = (\text{NPPEB} - D(T)) \cdot f(T, D(T)) \cdot T \quad (6)$$

where NPPEB is the number of pages per erasure block. As seen from equations (4)-(6), the total amount of wear of an erasure block, i.e., the value of TotalWear, is a function of SSD parameters (e.g., number of pages per erasure block, etc.) and the over-provisioning for each T. It should be noted that the over-provisioning for each T can alternatively be transformed into a garbage collection deadness threshold. For example, controller 12 may allocate a certain amount of over-provisioning for a particular temperature, and then garbage collect the erasure block that is "most dead" at that particular temperature when a new erasure block is needed to be available at that particular temperature.

As seen from the above, controller 12 may determine the over-provisioning across the set of all T values by an empirical multi-variate analysis technique (e.g., perturbation, matrix inversion, or the like), or by analytical methods, that adjust the over-provisioning to minimize wear with the additional constraint that the sum of the over-provisioning for each T at any point in time cannot exceed the amount of over-provisioned space in the entire SSD. In some examples, the over-provisioning may be determined for an expected workload. In other examples, the over-provisioning may be adaptively adjusted during operation based on an estimated probability density function of the workload.

Erasure blocks that are made available by garbage collection may be used in a first-in first-out (FIFO) manner. However, in some examples, the erasure blocks may be allocated by controller 12 such that their remaining wear capability is proportional to the estimated temperature of the data for which the erasure block is being allocated. For example, an erasure block that has a high erasure count (indicating that the remaining wear capability of the erasure block is low) may be allocated to store cold data. By its nature, cold data will not change frequently and, as such, may not induce significant wear in an erasure block. In contrast, an erasure block that has a low erasure count (indicating that the remaining wear capability of the erasure block is high) may be allocated to store hot data. By its nature, hot data will change frequently and, as such, may induce significant wear in an erasure block. Thus, allocating cold data to highly worn erasure blocks and allocating hot data to erasure blocks with high remaining wear capability takes advantage of properties of the data and the erasure block.

Controller 12 may store the temperature of the data as metadata along with user data in erasure blocks 24 of non-volatile memory 20. For instance, controller 12 may populate a metadata table in each erasure block that describes the state of each erasure block, including, for example, the data storage area of the SSD to which the erasure block belongs and the estimated temperature of that data storage area at the time the erasure block began filling with data. In other examples, controller 12 may store the temperature as metadata elsewhere. For instance, the metadata for the temperature of each erasure block may be stored in a system-wide table in the memory of controller 12 of SSD 10. Controller 12 may store the metadata in non-volatile memory and be recoverable. However, it is not necessary that the metadata be recoverable and, as such, the metadata may be stored in volatile memory, e.g., volatile memory 14.

In addition, controller 12 may store in a metadata table a time estimate of when the erasure block started to be filled again with data. As mentioned above, controller 12 may use this time estimate to estimate the heat of the data in the erasure block.

Controller 12 may store additional data as metadata. For example, controller 12 may store the physical location in an erasure block at which point new data written by the host was appended to garbage-collected data. That is, each time controller 12 stores data in one of the data storage areas of the SSD, controller 12 may keep track of the location in the erasure block before which garbage-collected data was written and after which new host data was written. Controller 12 may then be able to identify the two different portions that have data at two different temperatures than when the data was written into the erasure block.

Controller 12 may also store additional data, such as the approximate heat of the garbage-collected data at the time it was copied into the erasure block. During garbage collection, data copied into an erasure block may have been copied from multiple erasure blocks. The data in the source erasure blocks, however, may have had different temperatures. In accordance with techniques of this disclosure, during garbage collection, controller 12 may assign one temperature estimate for all data being copied into a single erasure block. That is, controller 12 may assign one temperature estimate to garbage-collected data copied into a single erasure block from multiple erasure blocks. Controller 12 may determine a single temperature estimate using numerous techniques.

As examples, controller 12 may use the minimum, maximum, or weighted average of the mappable units' estimated heat of the data when it was last copied. During garbage collection, controller 12 may use this additional data to make a different decision as to where to copy the previously garbage-collected data than it makes for the data that was not previously garbage-collected, if the temperatures are sufficiently different. For example, controller 12 may use this additional information to separate out host data, which controller 12 may assign one temperature, from garbage-collected data, which controller 12 may assign another temperature. In this manner, controller 12 may effectively segregate data.

As mentioned above, controller 12 may store data segregated into different temperatures into different storage areas, e.g., erasure blocks. Controller 12 may use numerous temperature-segregating heat allocation strategies to store data segregated into different temperatures into different storage areas. For instance, controller 12 may maintain a number Z erasure blocks for writing at any time, with each of the Z erasure blocks assigned a different temperature of data that may be written to the block. Of course, multiple erasure blocks may be assigned the same temperature estimate to accommodate larger sets of data.

In other examples, controller 12 may assign data one of three different temperature estimates and then segregate data based on those three temperatures into one of three storage areas. For instance, static wear-leveled data may be "cold," garbage-collected data may be "warm," and host written data may be "hot." Each of the three storage areas may be a plurality of erasure blocks. In this manner, cold data may written into a first storage area, warm data may be written into a second storage area, and hot data may be written into a third storage area. Using the techniques described earlier in this disclosure, the first storage area may have less over-provisioning than the second storage area, and the second storage area may have less over-provisioning than the third storage area.

In another example, controller 12 may assign data one of one hundred different temperature estimates and segregate data based on those one hundred temperature estimates into one of one hundred different storage areas. In such an implementation, controller 12 may use equation (1) above to estimate the heat of data written by the host. In this manner, controller 12 may assign all data to one of the one hundred different storage areas and then store the data in one of the data storage areas based on the temperature categorization.

In another example, controller 12 may assign data one of two different temperature estimates and segregate data based on those two temperature estimates into one of two different storage areas. In such an implementation, hot data may be written to the erasure blocks that have the smallest erasure counts and therefore the most wear capability remaining, and cold data may be copied into erasure blocks whose wear capability is at a threshold chosen so that the number of writes expected for the cold data for the remainder of the SSD lifetime, compared to the number of hot-data writes expected for the remainder of the SSD lifetime equals the cumulative wear capability of the erasure blocks with as much or more wear than this threshold, compared to the cumulative wear capability of the erasure blocks with less wear than this threshold. In one example, the two different temperature estimates may be "hot" and "cold." In such an implementation, controller 12 may assign all data written by the host as "hot" data and all other data as "cold" data. Controller 12 may determine the threshold by maintaining an infinite-impulse response (IIR)-filtered estimate of the amount of hot and cold data "seen" by controller 12.

By way of a simplified, specific example, assume that controller 12 determines that 25% of the data being written is "hot" (i.e., from the host), and 75% of the date being written is cold (i.e., copied by the garbage collection process). Further assume that there are 1000 erasure blocks containing about 800 erasure blocks' of host data, of which the following erasure capability exists:

TABLE 1

| Erasure Count | Erasures Remaining in EB | EBs at this wear level | Total EB-erasures at this wear level | No. of EB-erasures at or above this wear level |
|---|---|---|---|---|
| Life-400 | 400 | 50 | 20000 | 100% |
| Life-350 | 350 | 50 | 17500 | 89% |
| Life-300 | 300 | 75 | 22500 | 79% |
| Life-250 | 250 | 100 | 25000 | 67% |
| Life-200 | 200 | 125 | 25000 | 53% |
| Life-150 | 150 | 250 | 37500 | 40% |
| Life-100 | 100 | 350 | 35000 | 19% |
| Total | | 1000 | 182500 | |

Table 1 illustrates, per erasure count wear level (column 1 from left), the following: the number of erasures remaining in an erasure block (EB) (column 2 from left); the number of erasure blocks in a wear level (column 3 from left); the total number of erasure block erasures at a particular wear level (column 4 from left), and the number of erasure block erasures at or above a particular wear level (column 5 from left). Using the techniques of this disclosure, controller 12 may write cold data to erasure blocks at an erasure count of Life-300 erases, or more, and write hot data to erasure blocks at an erasure count of Life-300 erases, or less. Such an implementation may result in wearout of the lesser-worn erasures blocks by hot data at about the same time that the cold data wears out the already-more-worn erasure blocks. Controller 12's selection of an erasure block for garbage collection at this time may depend on whether controller 12 is searching for an erasure block to write hot or cold data in to. If searching for an erasure block to write hot data in to, controller 12 searches for the most-dead erasure block in the set of erasure blocks that is at-most worn to the Life-300 level. If searching for an erasure block to write cold data into, controller 12 searches for the most-dead EB in the set of erasure blocks that is at-least worn to the (Life-300) level.

In another example data segregating technique, controller 12 may choose to write data to an erasure block based on the likelihood of future host writing and the remaining wear capability of an erasure block. In such an example, system 30 may use an erasure-block mapping scheme, rather than the page-mapping scheme described above.

Assume that system 30 defines time "t" as the number of erasure block allocations that occurred prior to the last allocated erasure block. Further assume that system 30 maintains a "free list" containing a number of erasure blocks that are available for allocation, and that as an erasure block has the last of its contained data invalidated (i.e., the last of its contents are re-written into another erasure block, or are unallocated by a "trim" command, for example), the erasure block is erased and is returned to the "free list." Controller 12 may sort the probability density function (pdf) of all mappable host address sets by likelihood of selection for writing by the host, i.e., the temperature of the data.

Figure 13:
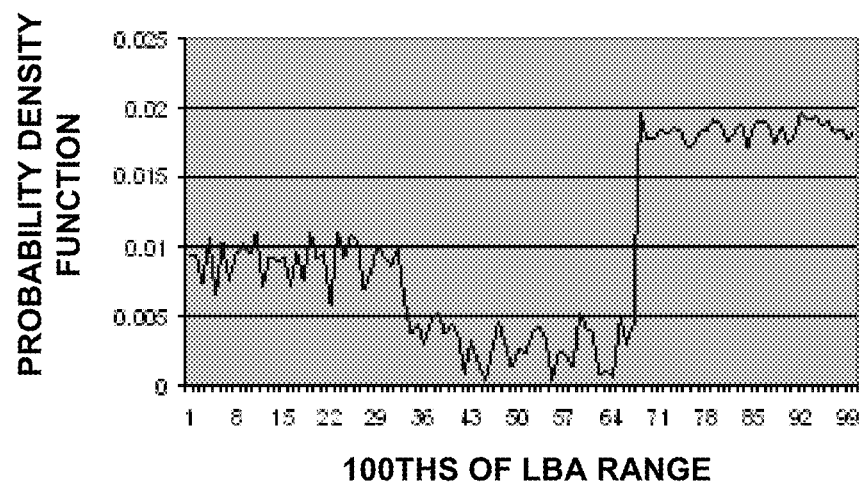
FIGS. 13 and 14 are example graphs depicting the probability density function of future host writes.
Figure 14:
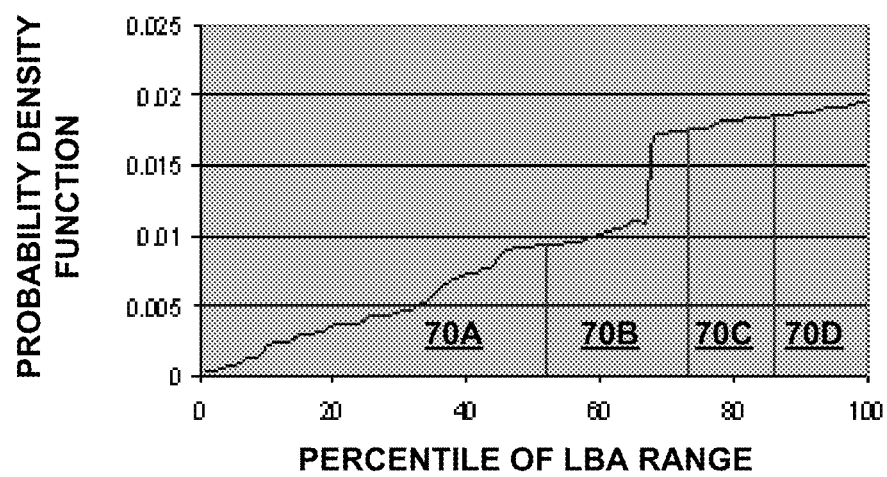

FIGS. 13 and 14 are example graphs depicting the estimated probability density function of future host writes. FIG. 13 shows an example of an estimated, un-sorted pdf of the frequency of writing each of 100 LBA bands (1/100ths of the LBA range for an SSD). FIG. 14 shows the same data as FIG. 13, but is sorted by temperature rather than by LBA. The 100 LBA bands from FIG. 13 were sorted by heat to determine the estimated pdf in FIG. 14. In FIG. 14, the 100 LBAs are divided into four equal-area sets 70A-70D, or heat-quartiles. In other words, each set 70A-70D will each receive 25% of the writes, on average.

Figure 15:
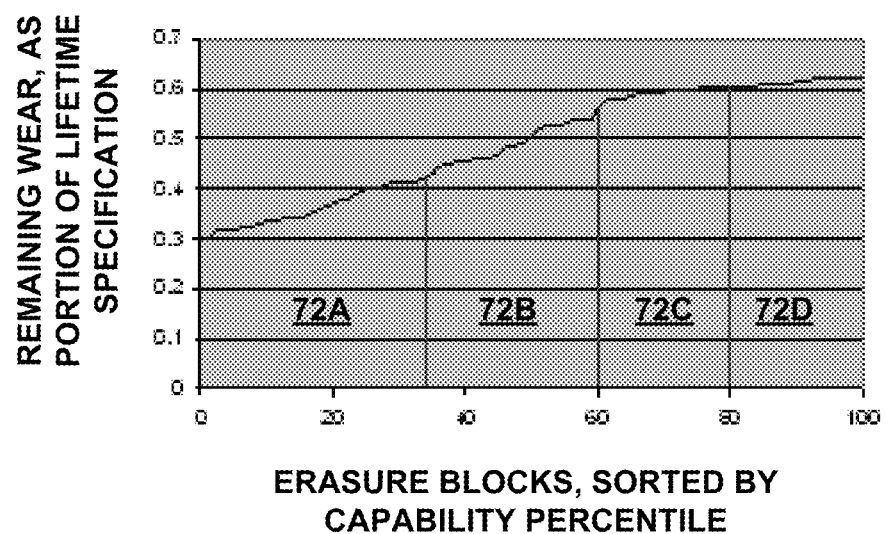
FIG. 15 is an example graph depicting the remaining wear capability of one hundred erasure blocks, sorted by wear rather than by erasure block number.

FIG. 15 is an example graph depicting the remaining wear capability of 100 erasure blocks, sorted by wear rather than by erasure block number. The wear capability may be measured, for example, by the remaining erasure counts according to the manufacturer's specification. In FIG. 15, the 100 erasure blocks are divided into four equal-area sets 72A-72D, or wear-quartiles. Using the techniques of this disclosure, if a host writes data addressed to an LBA in a particular heat-quartile, controller 12 may assign that data to an erasure block in a matched wear-quartile. For example, controller 12 may match the integration limits in FIG. 14 to result in the same integral limits in FIG. 15, controller 12 may select an appropriate wear level for the next erasure block to be allocated, which may allow controller 12 to avoid having to perform a predictably non-zero number of static wear-leveling copies at a later time. Although a smaller number of equal-area regions may reduce the number of times that random variation leads to a block with a particular wear capability being deemed to have been sub-optimally matched up to a new host block of a particular heat, a larger number of allocation regions may improve the match up between the heat of data and the wear capability of an erasure block.

Figure 16:
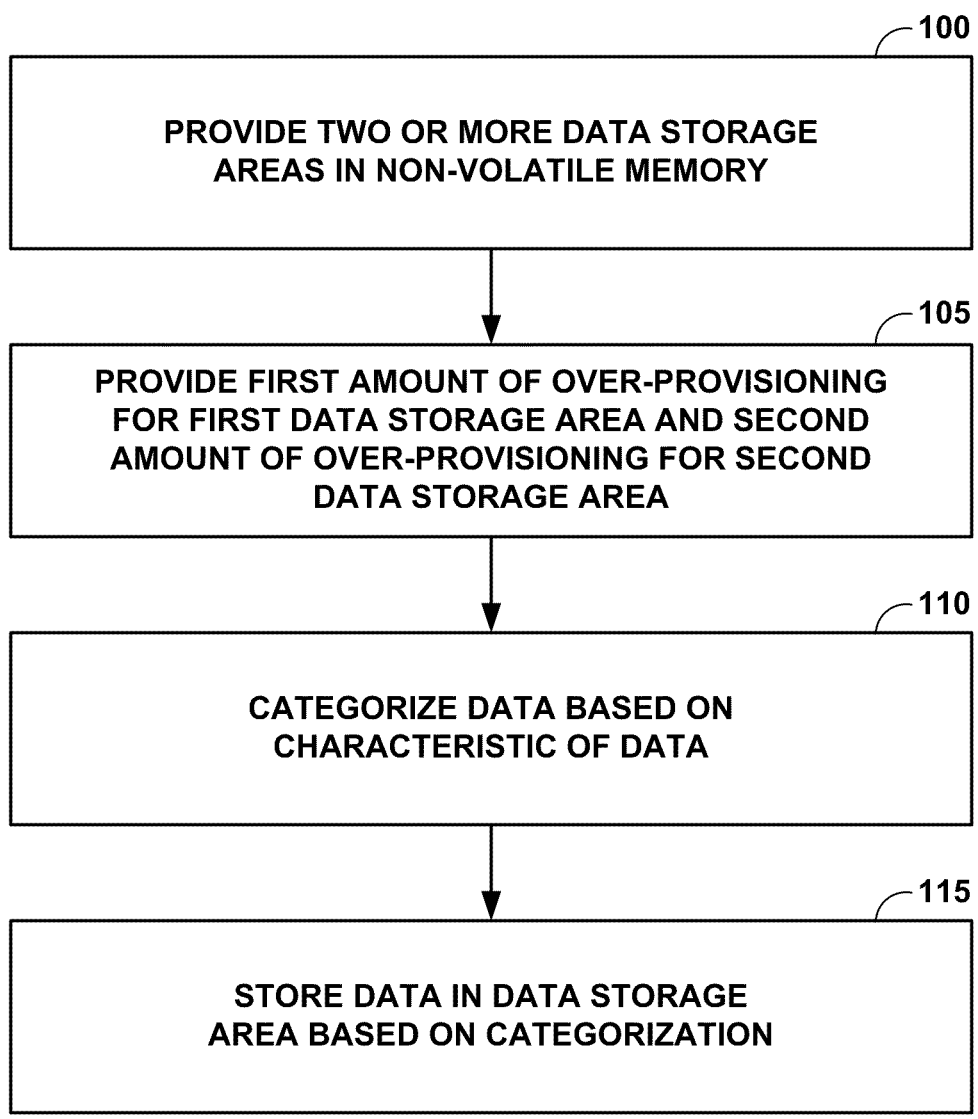
FIG. 16 is a flow diagram illustrating an example method for segregating data in a non-volatile memory, in accordance with various techniques of this disclosure.

FIG. 16 is a flow diagram illustrating an example method for segregating data in a non-volatile memory, in accordance with this disclosure. Controller 12 of FIG. 12, for example, provides two or more data storage areas in non-volatile memory (100). For instance, controller 12 may provide first data storage area 60 and second data storage area 62 in non-volatile memory 20 of FIG. 12. Then, controller 12 provides a first amount of over-provisioning for a first of the two or more data storage areas and a second amount of over-provisioning for a second of the two or more two data storage areas (105). Referring again to FIG. 12, controller 12 may provide first data storage area 60 with a number of erasure blocks 24 for over-provisioning (i.e., a number of erasure blocks greater than the number of erasure blocks advertised to a host, for example) and provides second data storage area 62 with a different number of erasure blocks 24 for over-provisioning. Controller 12 categorizes data based on a characteristic of the data (110). For example, controller 12 may categorize data based on a frequency of write access of the data, i.e., the temperature of the data. Then, controller 12 may store the data in one of the two data storage areas based on the categorization (115). In one example, the data may be data written by a host and/or data that is copied from at least a first erasure block to at least a second erasure block.

In some examples, the first amount of over-provisioning is greater than the second amount of over-provisioning, and storing the data in one of the two or more data storage areas based on the categorization includes storing data categorized as having a higher frequency of write access in the first of the two or more data storage areas. In one example, controller 12 may store the categorization of the data in at least one of non-volatile memory 20 and a memory in controller 12.

In some examples, controller 12 may store the data in one of the data storage areas based on the categorization by storing the data copied from at least a first erasure block to at least a second erasure block, storing the data written by the host at a location adjacent to the copied data, and then storing the location in at least one of non-volatile memory 20 and a memory in controller 12.

In one example, controller 12 may store, in at least one of non-volatile memory 20 and controller 12, e.g., memory within controller 12, the categorization of the data that is copied from at least a first erasure block to at least a second erasure block at a time when the data is copied to the at least a second erasure block.

The techniques described in this disclosure may be implemented, at least in part, in hardware, software, firmware or any combination thereof. For example, various aspects of the described techniques may be implemented within one or more controllers, one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "controller," "processor," or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The implementations described above and other implementations are within the scope of the following claims.

The invention claimed is:

1. A method comprising:
   providing at least two data storage areas in a memory;
   providing a first amount of over-provisioning for a first of the at least two data storage areas and a second amount of over-provisioning for a second of the at least two data storage areas;
   categorizing data being written by a host as having a first designation;

categorizing valid data being collected via a garbage collection operation as having a second designation;

assigning a sequence number to the data being written by the host;

updating the sequence number based on the categorization;

storing the data in either the first or the second of the at least two data storage areas based on the categorization and the sequence number; and selecting, for garbage collection, erasure blocks containing cold data but having a higher valid data density before selecting erasure blocks containing hot data but having a lower valid data density.

2. The method of claim 1, further comprising categorizing the data based on a frequency of write access of the data.

3. The method of claim 2, wherein the first amount of over-provisioning is greater than the second amount of over-provisioning, and wherein storing the data in one of the at least two data storage areas based on the categorization comprises:

storing data categorized as having a higher frequency of write access in the first of the at least two data storage areas.

4. The method of claim 2, further comprising:
storing the categorization of the data in at least one of the memory and a controller.

5. The method of claim 2, wherein the data is at least one of data written by a host and data that is copied from at least a first garbage collection unit to at least a second garbage collection unit.

6. The method of claim 5, wherein each of the first garbage collection unit and the second garbage collection unit comprise at least one erasure block.

7. The method of claim 5, wherein storing the data in one of the data storage areas based on the categorization comprises storing the data copied from at least the first erasure block to at least the second erasure block and storing the data written by the host at a location adjacent to the copied data, and wherein the method further comprises:

storing the location in at least one of a non-volatile memory and a memory in a controller.

8. The method of claim 5, further comprising:
storing, in at least one of the memory and a memory in a controller, the categorization of the data that is copied from at least the first erasure block to at least the second erasure block at a time when the data is copied to at least the second erasure block.

9. The method of claim 1, further comprising:
comparing a current sequence number assigned to the data being written by the host to a sequence number previously assigned to the valid data being collected via the garbage collection operation;

determining a difference value between the current sequence number and the sequence number previously assigned to the valid data being collected via the garbage collection operation; and categorizing the valid data being collected via the garbage collection operation as having the second designation when the determined difference value exceeds a threshold value.

10. The method of claim 1, wherein categorizing data being written by a host as having a first designation comprises:

comparing a current sequence number assigned to the data being written by the host to a sequence number previously assigned to previously written host data;

determining a difference value between the current sequence number and the sequence number previously assigned to the previously written host data; and categorizing the data being written by the host as having a first designation based on the difference value.

11. The method of claim 1, wherein the memory is non-volatile memory.

12. The method of claim 1, wherein selecting, for garbage collection, erasure blocks having a higher valid data density before selecting erasure blocks having a lower valid data density comprises maintaining or increasing the first amount of over-provisioning.

13. The method of claim 1, wherein selecting, for garbage collection, erasure blocks having a higher valid data density before selecting erasure blocks having a lower valid data density comprises selecting in response to the categorization of the data.

14. The method of claim 1, wherein the erasure blocks with the higher valid data density have a lower write frequency than the erasure blocks with the lower valid data density.

15. The method of claim 1, wherein the first designation includes data that is categorized as having a higher frequency of write access and the second designation includes data that is categorized as having a lower frequency of write access.

16. A system comprising;
a memory; and
at least one controller configured to:
provide at least two data storage areas in the memory;
provide a first amount of over-provisioning for a first of the at least two data storage areas and a second amount of over-provisioning for a second of the at least two data storage areas;
categorize data being written by a host as having a first designation;
categorize valid data being collected via a garbage collection operation as having a second designation;
assign a sequence number to the data being written by the host;
updating the sequence number based on the categorization;
store the data in either the first or the second of the at least two data storage areas based on the categorization and the sequence number; and
select, for garbage collection, erasure blocks containing cold data but having a higher valid data density before selecting erasure blocks containing hot data but having a lower valid data density.

17. The system of claim 16, wherein the at least one controller is configured to:
categorize the data based on a frequency of write access of the data.

18. The system of claim 17, wherein the at least one controller is further configured to:
compare a current sequence number assigned to the data being written by the host to a sequence number previously assigned to the valid data being collected via the garbage collection operation;
determine a difference value between the current sequence number and the sequence number previously assigned to the valid data being collected via the garbage collection operation; and
categorize the valid data being collected via the garbage collection operation as having the second designation when the determined difference value exceeds a threshold value.

19. The system of claim 18, wherein the at least one controller is further configured to update the sequence number by decrementing the sequence number when the determined difference value exceeds the threshold value.

20. The system of claim 17, wherein the at least one controller configured to categorize data being written by a host as having a first designation is further configured to:
compare a current sequence number assigned to the data being written by the host to a sequence number previously assigned to previously written host data;
determine a difference value between the current sequence number and the sequence number previously assigned to the previously written host data; and
categorize the data being written by the host as having a first designation based on the difference value.

21. The system of claim 17, wherein the first amount of over-provisioning is greater than the second amount of over-provisioning, and wherein the at least one controller, configured to store the data in one of the at least two data storage areas based on the categorization, is configured to:
store data categorized as having a higher frequency of write access in the first of the at least two data storage areas.

22. The system of claim 17, wherein the at least one controller is further configured to:
store the categorized data in at least one of the memory and the controller.

23. The system of claim 17, wherein the data is at least one of data written by a host and data that is copied from at least a first garbage collection unit to at least a second garbage collection unit.

24. The system of claim 23, wherein each of the first garbage collection unit and the second garbage collection unit comprise at least one erasure block.

25. The system of claim 23, wherein the at least one controller, configured to store the data in one of the data storage areas based on the categorization, is configured to store the data copied from at least a first erasure block to at least a second erasure block and store the data written by the host at a location adjacent to the copied data, and wherein the at least one controller is further configured to:
store the location in at least one of the memory and the controller.

26. The system of claim 23, wherein the at least one controller is further configured to:
store, in at least one of the memory and a memory in the controller, the categorization of the data that is copied from at least the first erasure block to at least the second erasure block at a time when the data is copied to the at least the second erasure block.

27. The system of claim 16, wherein the memory is non-volatile memory.

28. The system of claim 16, wherein the at least one controller is further configured to update the sequence number by incrementing the sequence number in response to a host write.

29. The system of claim 28, wherein the at least one controller is further configured to update the sequence number by decrementing the sequence number in response to a garbage collection operation.

30. A non-transitory computer-readable storage medium comprising instructions encoded on the computer-readable medium that, upon execution, cause a controller within a device to:
provide at least two data storage areas in a memory;
provide a first amount of over-provisioning for a first of the at least two data storage areas and a second amount of over-provisioning for a second of the at least two data storage areas;
categorize data being written by a host as having a first designation;
categorize valid data being collected via a garbage collection operation as having a second designation;
assign a sequence number to the data being written by the host;
update the sequence number based on the categorization;
store the data in either the first or the second of the at least two data storage areas based on the categorization and the sequence number; and
select, for garbage collection, erasure blocks containing cold data but having a higher valid data density before selecting erasure blocks containing hot data but having a lower valid data density.

31. The non-transitory computer-readable storage medium of claim 30, wherein the instructions cause the controller to:
categorize the data based on a frequency of write access of the data.

32. The non-transitory computer-readable storage medium of claim 30, further comprising instructions that, upon execution, cause the controller to:
compare a current sequence number assigned to the data being written by the host to a sequence number previously assigned to valid data being collected via the garbage collection operation;
determine a difference value between the current sequence number and the sequence number previously assigned to the valid data being collected via the garbage collection operation; and
categorize the valid data being collected via the garbage collection operation as having the second designation when the determined difference value exceeds a threshold value.

33. The non-transitory computer-readable storage medium of claim 30, wherein the instructions that cause the controller to categorize data being written by a host as having a first designation further comprise instructions that, upon execution, cause the controller to:
compare a current sequence number assigned to the data being written by the host to a sequence number previously assigned to previously written host data;
determine a difference value between the current sequence number and the sequence number previously assigned to the previously written host data; and
categorize the data being written by the host as having a first designation based on the difference value.

34. The non-transitory computer-readable storage medium of claim 30, wherein the first amount of over-provisioning is greater than the second amount of over-provisioning, and wherein the instructions that cause the controller to store the data in one of the at least two data storage areas based on the categorization comprise instructions that, upon execution, cause the controller to:
store data categorized as having a higher frequency of write access in the first of the at least two data storage areas.

35. The non-transitory computer-readable storage medium of claim 30, further comprising instructions that, upon execution, cause the controller to:
store the categorization of the data in at least one of the memory and the controller.

36. The non-transitory computer-readable storage medium of claim 30, wherein the data is at least one of data written by a host and data that is copied from at least a first garbage collection unit to at least a second garbage collection unit.

37. The non-transitory computer-readable storage medium of claim 36, wherein each of the first garbage collection unit and the second garbage collection unit comprise at least one erasure block.

38. The non-transitory computer-readable storage medium of claim 36, wherein the instructions that cause the controller to store the data in one of the data storage areas based on the categorization comprise instructions that, upon execution, cause the controller to store the data copied from at least the first erasure block to at least the second erasure block and storing the data written by the host at a location adjacent to the copied data, and wherein the computer-readable storage medium further comprises instructions that, upon execution, cause the controller to:
- store the location in at least one of the memory and the controller.

39. The non-transitory computer-readable storage medium of claim 36, further comprising instructions that, upon execution, cause the controller to:
- store, in at least one of the memory and the controller, the categorization of the data that is copied from at least the first erasure block to at least the second erasure block at a time when the data is copied to the at least the second erasure block.

40. The non-transitory computer-readable storage medium of claim 30, wherein the memory is non-volatile memory.

* * * * *